United States Patent
Shiraishi et al.

(10) Patent No.: US 6,576,026 B1
(45) Date of Patent: Jun. 10, 2003

(54) METHOD OF PRODUCING AN ANODE BODY HAVING A LAMINATE OF A PLURALITY OF SHEETS OF VALVE METAL FOIL

(75) Inventors: Seigo Shiraishi, Hirakata (JP); Emiko Igaki, Amagasaki (JP); Masakazu Tanahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 09/654,132

(22) Filed: Sep. 1, 2000

Related U.S. Application Data

(62) Division of application No. 09/335,741, filed on Jun. 18, 1999, now Pat. No. 6,400,554.

(30) Foreign Application Priority Data

Jun. 19, 1998 (JP) .......................................... 10-173056
Mar. 26, 1999 (JP) .......................................... 11-083703

(51) Int. Cl.⁷ .............................. H01G 9/00; H01G 9/04; H01G 2/10
(52) U.S. Cl. ...................... 29/25.03; 361/508; 361/528; 361/535
(58) Field of Search .......................... 29/25.03; 361/523, 361/508, 529, 535, 538, 528; 427/79, 80

(56) References Cited

U.S. PATENT DOCUMENTS

| | | | |
|---|---|---|---|
| 4,071,878 A | * | 1/1978 | Stynes |
| 5,707,407 A | | 1/1998 | Ohi et al. ................. 29/25.03 |
| 5,812,366 A | | 9/1998 | Kuriyama ................. 361/523 |
| 6,249,423 B1 | * | 6/2001 | O'Phelan et al. |
| 6,310,765 B1 | * | 10/2001 | Tanahashi et al. |

* cited by examiner

Primary Examiner—Ha Tran Nguyen
(74) Attorney, Agent, or Firm—Wenderoth, Lind & Ponack, L.L.P.

(57) ABSTRACT

The present invention provides an electrolytic capacitor and its anode body using a laminate of plurality of sheets of valve metal foil, exhibiting excellent high-frequency response and lower inner impedance as a electrolytic capacitor. The anode body for a electrolytic capacitor includes; a laminate of plurality of rectangular anode valve metal foil each which has dielectric layers of its metal oxide film anodized on roughened surfaces of each anode valve metal foil; and a fixing frame to clamp the laminate in the laminating direction to fix the laminate and connect electrically with anode layers of the laminated foil. Such an anode body may be used to be filled in the liquid electrolyte in the container to make a capacitor.

17 Claims, 19 Drawing Sheets

METHOD OF PRODUCING AN ANODE BODY HAVING A LAMINATE OF A PLURALITY OF SHEETS OF VALVE METAL FOIL

This is a divisional of application Ser. No. 09/335,741, filed Jun. 18, 1999, now U.S. Pat. No. 6,400,554.

BACKGROUND OF THE INVENTION

1. Field of the Invention

The present invention relates to an electrolytic capacitor using valve action metal foils, an anode body utilized for an electrolytic capacitor, and method for producing the same.

2. Prior Art

In conventional electrolytic capacitors, valve action metals such as aluminum and tantalum are used as an anode. An oxide film formed on the surface of the metal is used as a dielectric layer to form an anode body. Furthermore, the anode body is applied with liquid or solid electrolyte on the dielectric oxide film, and an anode lead portion and a cathode lead portion are connected to the valve metal and the electrolyte, respectively, the whole capacitor being packaged.

As for the electrolyte of the conventional cathode, an organic solvent, or the like, containing an organic acid, has been used in aluminum electrolytic capacitors, and manganese dioxide in tantalum electrolytic capacitors.

Furthermore, recently, the high-frequency response of electronic parts has increased as electronic circuits have been digitized; and the high frequency response of electrolytic capacitors have been required to improve as well. Proposals have been put forth to use a conductive polymer layer having a high electric conductivity as a cathode electrolyte, to improve the response characteristics by lowering the impedance. Such capacitors have been developed, and put on the market.

On the other hand, as electric and electronic devices are reduced in size, electrolytic capacitors used in them are also required more intensely to have smaller sizes with larger capacitance.

In order to achieve a smaller size and larger capacitance, an anode body formed by laminating a large number of sheets of valve metal foil is also known as an anode body used in electrolytic capacitors. For example, in Japanese Patent Publication JA-A 61-30020, an anode body is disclosed. According to the Publication, sheets of valve metal foil formed so as to have a predetermined size by blanking are laminated. The sheets of valve metal foil are integrated by partially welding some side face of the sheets, and thereafter, the entire laminate is anodized to form a dielectric oxide film on each valve metal layer.

However, the above described method has problems mainly in the following two points. First, if sheets of valve metal foil are laminated and thereafter, anodization is conducted in the state of lamination, then it is extremely difficult to sufficiently anodize all the inner layers of the laminate. As a result, a sufficient dielectric oxide film cannot be formed. If the dielectric oxide film cannot be formed sufficiently, then the capacitance per unit volume in the anode body in an electrolytic capacitor obtained as a final product may be lower than that expected at the time of design, or the breakdown voltage value becomes lower.

Second, in the conventional method, the sheets of metal foil are blanked with a predetermined size. For the requirement of size reduction of electronic parts, therefore, it is necessary to make the laminated metal foils smaller to obtain a small-sized anode body, in accordance with the final capacitor shape. However, there was a limit in production of the low size of valve metal foils and it was further more difficult to laminate such small valve metal foils to anode bodies.

SUMMARY OF THE INVENTION

An object of the present invention is to provide an anode body and a method for producing the anode body, in which a sufficient dielectric oxide film can be formed as far as the inside of the anode body formed by laminating sheets of valve metal foil, which is used in an electrolytic capacitor.

Another object of the present invention is to provide an anode body providing a capacitance that capacitors should have, which can be taken out as efficiently as expected from the whole anode body, and a method for fabricating such an anode body.

Another object of the present invention is to provide an anode body for an electrolytic capacitor whose size reduction can be achieved in mass production processes, and a method for fabricating such an anode body.

A further object is to provide an electrolytic capacitor having an excellent high-frequency characteristic with lower impedance, and a method for producing such an electrolytic capacitor.

In a capacitor anode body of the present invention, a fixing frame surrounds the periphery of a laminate including a plurality of sheets of anode valve metal foil, each having a dielectric oxide film formed beforehand on a surface thereof, thereby fixing the laminate. Edges of the anode valve metal foil are exposed on both side faces of the laminate.

In this structure, the fixing frame may be used as an anode conductor by contacting the frame with every valve metal foil in the laminate.

For the anode body, each of sheets of the anode valve metal foil already has the dielectric layer. Therefore, an electrolyte can be impregnated through the edges of exposed side of the laminate into the valve metal foils to form a cathode layer on each of the dielectric layer on the valve metal foils, which is used as an electrolytic capacitor.

The anode body may be employed as an solid electrolytic capacitor by applying a conductive polymer for the electrolyte. In the capacitor, the conductive polymer as cathode layers is formed on the anodized surface of the laminated valve metal foils, which is exposed on the side of the laminate and can contacts with a cathode conductor attached on the side.

The laminate can provide the width between both side faces of the laminate when using rectangular sheets of the anode valve metal foil, i.e., the width of the laminate can be made small. As for the anode body having such a structure, the cathode conductor is applied to the cathode layer exposed on the side face of the laminate. By reducing the width of the laminate, it is possible to shorten electric paths of the cathode layer extending from the dielectric layer of each of sheets of the anode valve metal foil to the cathode conductor. Thus, the internal impedance is lowered in the complete capacitor.

The size of the anode body according to the present invention can be further reduced by making the fixing frame of valve metal, electrically connecting the fixing frame to a metal portion of sheets of the anode valve metal foil, and making the fixing frame serve also as an anode terminal in an electrolytic capacitor of a final product.

In an electrolytic capacitor according to the present invention, the conductive polymer layer is formed beforehand on the dielectric layer which is formed on each of a plurality of sheets of the anode valve metal foil to be laminated. The sheets of the anode valve metal foil are fixed by the fixing frame, resulting in a laminate. A capacitor element is thus obtained, and a cathode conductor and an anode conductor are connected thereto.

In common to the methods of producing an electrolytic capacitor and its anode body according to the present invention, lengthy sheets of anode valve metal foil are laminated, fitted integrally into a groove portion of a lengthy channel-shaped frame. The lengthy laminate is subjected to cutting to yield a large number of anode bodies or capacitor elements. To each anode body or a capacitor element, a cathode conductor and an anode conductor are connected.

A fixing frame surrounds the periphery of a laminate including a plurality of sheets of anode valve metal foil, each having a dielectric oxide film formed beforehand on a surface thereof, and fixes the laminate. On both side faces of the laminate, edges of sheets of the anode valve metal foil are exposed. In the structure of the anode body, each of sheets of the anode valve metal foil already has the dielectric layer. Therefore, when forming a conductive polymer layer on each of the sheets of the anode valve metal foil, it becomes easy to make a monomer to penetrate from the edge portions of sheets of the anode valve metal foil by exposing the monomer to the side face into the laminate, cause polymerization, and thereby form a conductive polymer.

DESCRIPTION OF THE PREFERRED EMBODIMENTS

Figure 1A:
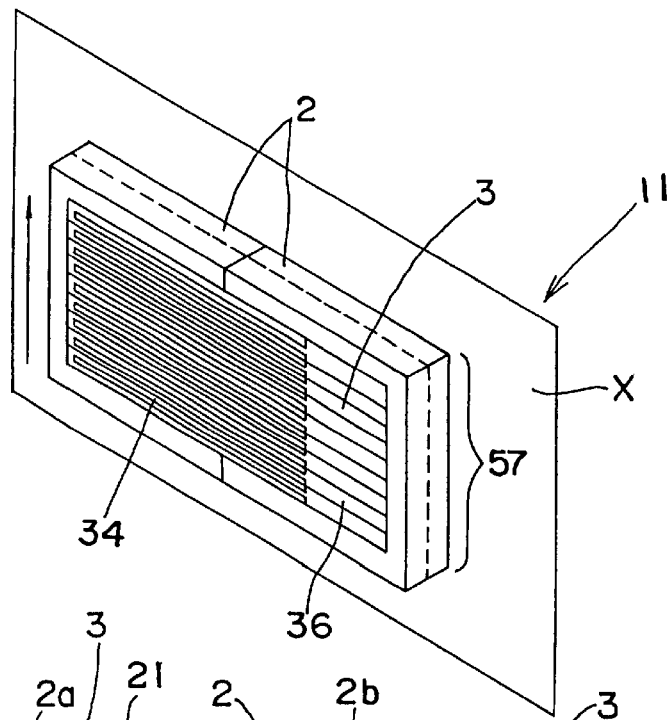
FIG. 1A is a perspective view of a capacitor anode body according to an embodiment of the present invention.

An anode body for an electrolytic capacitor according to the present invention comprises a laminate of sheets of valve metal foil having a dielectric layer formed on the surface thereof and a fixing frame for fixing the laminate.

The valve metal foil is utilized as an anode layer, whose surface is anodized beforehand to form an oxide film of the metal to be a dielectric layer.

A large number of sheets of metal foil are laminated with surfaces opposed to each other. The laminate is pressed at top and bottom faces of the laminate by the fixing frame. The fixing frame is thus fixed to the laminate so as to be integral therewith and form an anode body.

Thus, since the dielectric oxide film is formed in the foil state before lamination and then lamination is conducted, an anode body having a sufficient dielectric oxide film formed while it is still in the laminate state can be realized.

In the anode body of the present invention, side faces of the laminate are exposed without being covered by the fixing frame. Since edges of a large number of sheets of valve metal foil are exposed on the side faces of the laminate, the side faces are used to connect a cathode conductor to a conductive polymer layer serving as a cathode layer.

Furthermore, for reducing internal resistance, the thickness of the laminate, i.e., the width between both side faces is reduced. This can be achieved by laminating narrow-width sheets of metal foil.

In the capacitor anode body of the present invention, therefore, rectangular sheets of anode valve metal foil are laminated. On at least one of side faces formed by its longer side and the laminating direction of the laminate, the frame is not disposed. Also in the case where liquid or solid electrolyte is supported by and formed on the anode body of the present invention as a cathode layer, therefore, it is possible to minimize the physical length of the supported or formed cathode, i.e., the length of the path for pulling out the capacitance. As a result, the impedance of the electrolytic capacitor can be lowered.

To be more precise, in the present invention, a stable thin oxide film is formed on the surface of the valve metal foil for the anode, and the oxide film is selected from metals having insulating resistance and a high dielectric constant. As for the valve metal, aluminum, tantalum, or titanium can be used.

For obtaining large capacitance, it is desirable that the valve metal foil is subjected to surface roughening beforehand so as to have an expanded relative surface area. Especially, the surface roughening is applied to a region of the surface of the valve metal foil in which the cathode layer is formed.

The dielectric layer is obtained by forming an oxide film on the whole or a major portion of the surface of the valve metal foil by using anodization processing. The laminate is formed so that the dielectric layers of the valve metal layer will be opposed to each other.

The fixing frame is a member for pressing the top face and the bottom face of the laminate along the periphery of the laminate. The fixing frame may be closed ring-shaped or open ring-shaped. Typically, a yoke surrounding the top face, the bottom face, and end faces is utilized. By using a pair of yokes, a closed ring shape surrounding the periphery of the laminate can be formed. An open ring shape can also be formed by using one yoke. The fixing frame may be an insulator such as a synthetic resin, or may be a conductor made of a metal.

In particular, a metal fixing frame can be utilized to fix the laminate while being electrically connected to a metal portion of the anode valve metal foil. The fixing frame made of metal is formed of valve metal. On the surface of the frame, an insulation layer is formed by anodization processing. Therefore, even if the fixing frame comes in contact with the conductive polymer layer of the cathode layer, its electrical short circuit can be prevented.

In particular, such a fixing frame can be electrically connected to the anode layer of the valve metal foil. In this case, a metal terminal portion is provided on an outer face of the fixing frame, and the metal terminal portion also serves as an anode wiring member as well.

An electrolytic capacitor of the present invention has such an anode body as its basic structure, and further layer, a cathode conductor connected to the cathode layer, and an anode conductor connected to the valve metal foil serving as an anode conductor.

The conductive polymer layer is applied onto the dielectric layer of each of the stacked valve metal sheets of the anode body, and utilized as the cathode layer. The conductive polymer layer is impregnated in the laminate of the anode body. Alternatively, the conductive polymer layer may be attached to each of the sheets of valve metal foil before lamination.

As for the conductive polymer serving as the cathode layer, a compound especially having a large conductivity, such as pyrrole, can be selected out of heterocyclic five-member compounds. A polymer layer is formed on and stuck to the surface of each of sheets of anode valve metal foil from monomer of the conductive compound by oxide polymerization reaction.

As for the cathode conductor, a metal piece, a conductive polymer, and paste containing conductive particles are applied to exposed side faces of the laminate, and electrically connected to the conductive polymer layer of the cathode layer.

The anode conductor is connected to metal of the valve metal foil of the laminate. By using a metal wire or pin passing through the laminate, such a structure as to come in contact with almost all sheets of the valve metal foil can be adopted. Alternatively, it is also possible to adopt such a structure as to cause a metal piece attached to a side face of the laminate including a longer side of the rectangular valve metal foil to be conductive with the multi-layered valve metal foil by welding. It is also possible to heat layers of the multi-layered valve metal foil by welding so as to melt and short-circuit with each other and thereby cause conduction.

Furthermore, the anode conductor may be formed on an end face of the laminate including a short side of the rectangular valve metal foil. Utilization of an end face has an advantage that the thickness of the anode conductor or the capacitor is not increased.

Such an anode conductor can be connected to the above described fixing frame made of metal, and a metal terminal portion disposed on its external face can be used as an anode wiring member. The anode conductor may be connected to a separate conductor lead.

In this way, an electrolytic capacitor of the present invention includes a laminate including a plurality of sheets of valve metal foil each having an associated dielectric layer and a conductive polymer layer having dielectric layers; a fixing frame for fixing the laminate, an anode conductor for connecting the sheets of the valve metal foil to each other; and a cathode conductor connecting conductive polymer layers to each other. The laminate is fixed by the fixing frame pressing the top face and the bottom face of the laminate. A cathode conductor is formed on the side face of the laminate so as to be in direct contact with each conductive polymer layer. The cathode conductor is insulated from each of the sheets of the valve metal foil by an oxide film.

In this capacitor structure, sheets of the valve metal foil each having sufficient capacitance are fixed by the fixing frame, and capacitance per unit volume can be increased. An electrolytic capacitor having a small size and large capacitance can be realized.

A method of producing the anode body comprises steps of anodizing sheets of valve metal foil to form a dielectric oxide film in at least a part of the surface of each sheet, laminating a plurality of sheets of anode valve metal foil, fixing the laminated anode valve metal foil in the laminating direction and attaching the fixing frame material to them, and cutting the framed laminate material to separate it into a plurality of anode bodies each having a predetermined shape.

A method of producing the electrolytic capacitor, in the present invention, comprises steps of: forming conductive polymer layers on a plurality of lengthy sheets of valve metal foil respectively via oxide films; laminating a plurality of sheets of valve metal foil having conductive polymer layers formed so as to be integral therewith and thereby forming a laminate material; pressing an upper face and a bottom face of the laminate material by a fixing frame material and thereby integrating a plurality of laminated sheets of valve metal foil; cutting the framed laminate material perpendicularly to its longitudinal direction, to form a plurality of capacitor elements each having a predetermined shape, and thereby forming individual capacitor elements having a laminate of valve metal foil fixed by the fixing frame; anodizing the capacitor elements; and, forming a cathode conductor in each capacitor element, the cathode conductor being electrically connected to respective conductive polymer layers.

Such a method for fabricating anode bodies and capacitor elements has the following advantages. First, by forming the dielectric oxide film on the surface of valve metal foil beforehand to form each of sheets of the anode valve metal foil, and then laminating the sheets, a necessary and sufficient dielectric oxide film can be formed in a foil state beforehand. In the end, therefore, it is possible to obtain an electrolytic capacitor having a sufficient dielectric oxide film as far as a deep part of the laminate.

Secondly, according to the present method, a lengthy fixing frame material made of a metal is attached to the laminate in order to fix the laminated sheets of the lengthy anode valve metal foil. Thereafter, the laminate can be cut together with the frame. It becomes easy to fabricate a large number of smaller sized anode body elements.

On a section of the laminate, a number of sheets of metal foil are exposed. As a side face of the above laminate, therefore, the section can be utilized to form the cathode layer and the cathode conductor. It is possible to make sure that the width between both side faces of the laminate, i.e., its width is small, by adjusting the cutting interval. It becomes easy to achieve a smaller size concurrently with lowering the capacitor impedance.

Owing to the method of the present invention, it is thus possible to fabricate a large laminate, divide it into a large number of portions to obtain elements each having a required shape, and fabricate efficient mass production of small sized anode body elements.

Thirdly, by re-anodizing the valve metal foil in the anode body elements each formed into a required shape by cutting, defects and stress caused by laminating and cutting can easily be cured later.

The method of the present invention may comprise steps of attaching a fixing frame to the laminate of a plurality of sheets of anode valve metal foil, and thereafter providing an anode conductor for electrically connecting and passing through the laminate of the anode valve metal foil. The anode conductor may be electrically connected to the fixing frame.

As such an anode conductor, metal wires or pins passing through both the laminate and the frame can be provided at equal intervals in the longitudinal direction.

In the cutting step, separation into a plurality of anode bodies each having a required shape may be conducted, and an anode conductor may be provided in each of resultant anode bodies. Furthermore, since the fixing frame can be connected to the laminate by utilizing the valve metal material for the fixing frame, the fixing frame can be utilized directly as the anode wiring member.

Owing to such a fabrication method, electric connection among all sheets of the valve metal foil becomes more perfect, and fabrication of such a capacitor anode body that the capacitance of the entire anode body can be taken out efficiently becomes possible.

Embodiment 1

Figure 1B:
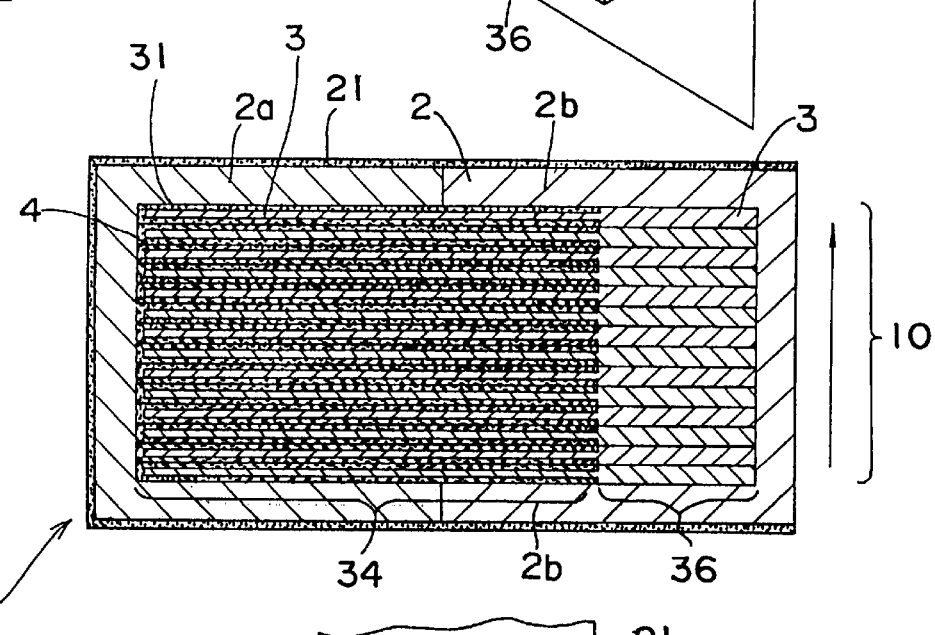
FIG. 1B is a sectional view of the capacitor anode body cut at its center portion in a thickness direction thereof.

As shown in FIGS. 1A and 1B, an anode body 1 of the present invention includes a fixing frame 2 having a narrow width and a rectangular outer shape, and a laminate having periphery surrounded by the fixing frame. For the laminate, a large number of sheets 3, 3, . . . of anode valve metal foil (aluminum foil in this example) each formed of strip-shaped valve metal having an oxide film formed in a part of its surface are laminated so that the sheets will be opposed to each other.

An oxide film portion 34 and a metal surface portion 36 are formed separately on the surface of each of sheets of the anode valve metal foil 3. The metal surface portions 36 of respective sheets of foil are brought into contact with each other so as to be electrically connected to each other.

Figure 1C:
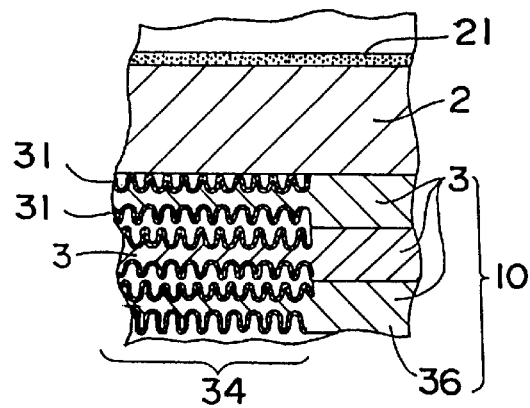
FIG. 1C is an enlarged view of a part of the anode body.

An enlarged view of a part of the anode valve metal foil 3 of aluminum is shown in FIG. 1C. As for the oxide film portion 34, the surface of the foil is roughened, and an aluminum oxide film is formed on the roughened surface. Dielectric oxide films 31 are thus formed.

A laminate 10 of aluminum foil is sandwiched and fixed between cramp portions of a fixing frame 2 for the sheets 3 of the valve metal foil, in the laminating direction thereof. In this example, the fixing frame 2 is made of aluminum which is the valve metal. The fixing framing 2 comprises a pair of half frames 2a and 2b, such as two yokes, which are confronted to each other to form a closed quadrate.

This frame 2 is electrically connected to almost all sheets of the anode valve metal foil 3 via the metal surface portions 36 of individual sheets of the anode valve metal foil 3 of the laminate 3 on which the dielectric oxide films 31 are not formed. However, the metal surface portions 36 of the anode valve metal foil 3 may be subjected to surface roughening. In the lamination state, the metal surface portions 36 come in contact with each other, so that conduction can be ensured.

The fixing frame 2 made of this valve action metal is electrically connected to the metal surface portions 36 of the anode valve metal foil 3. In an electrolytic capacitor of the final product, the fixing frame 2 made of this valve action metal can also serve as an anode terminal as well. The size of the capacitor can be thus reduced.

Such an anode body is impregnated between layers of the laminate with an electrolyte. The anode body is then enclosed in a receptacle or resin. A capacitor having a terminal portion of the frame or its lead and a lead connected to the electrolyte (not illustrated) as opposing poles is thus formed.

By caulking, the fixing metal frame 2 presses the periphery of the laminate in the laminating direction and covers the laminate. Preferably, however, the fixing metal frame 2 is disposed so as to expose the end face exhibiting the piled sheets of the foil of the laminate. In particular, on a plane X formed by a laminating direction indicated by arrows in FIGS. 1A and 2A and a longer side of rectangular sheets of the anode valve metal frame 3, the fixing frame 2 of the valve action metal is not disposed, but side edges of the longer sides of the sheets of the valve metal foil 3 are disposed.

When capacitance of the anode body, i.e., capacitance electrified in an aluminum oxide film serving as the dielectric oxide film 31 is pulled out via a separate cathode, the physical length of the cathode, in other words, the path for pulling out the capacitance can be made minimum owing to such a configuration. As a result, the impedance of the electrolytic capacitor obtained as the final product can be lowered.

Figure 7A:
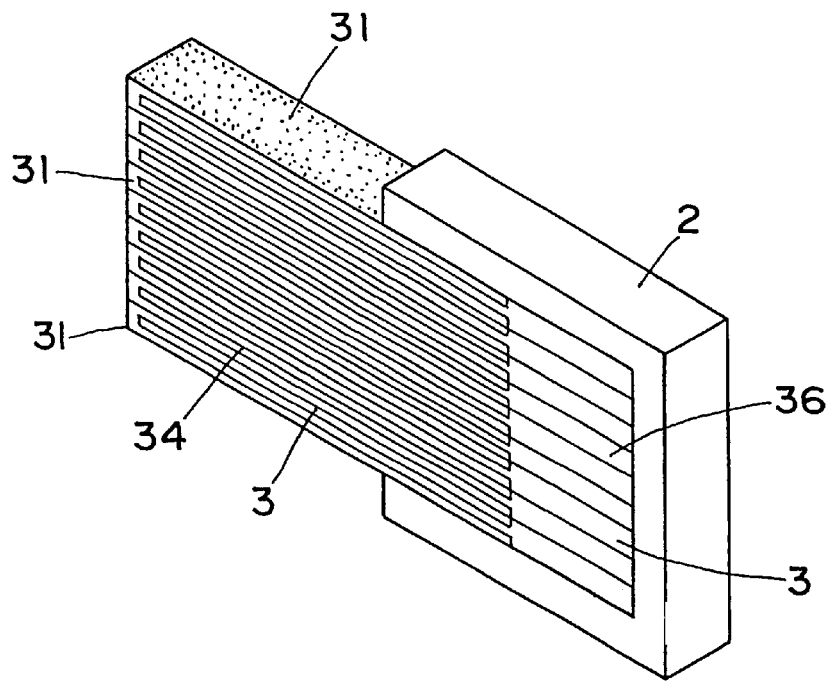
FIGS. 7A and 7B are perspective views of a capacitor anode body according to an embodiment of the present invention.

For the fixing frame, a half periphery frame having only one yoke capable of pressing the laminate in the laminating direction is also utilized. FIG. 7A shows another example of the fixing frame 2. The fixing frame 2 may be a half periphery frame using only one channel of metal such as aluminum. The metal surface portions 36 of the laminate of the anode valve metal foil 3 may be sandwiched in the lateral direction between portions of the fixing frame 2, and fixed.

A metal terminal portion 57 of a capacitor anode body is utilized directly as an anode terminal or an anode conductor for connecting a lead for the anode. The metal terminal portion 57 may connected with a lead wire which is welded thereto.

Figure 2A:
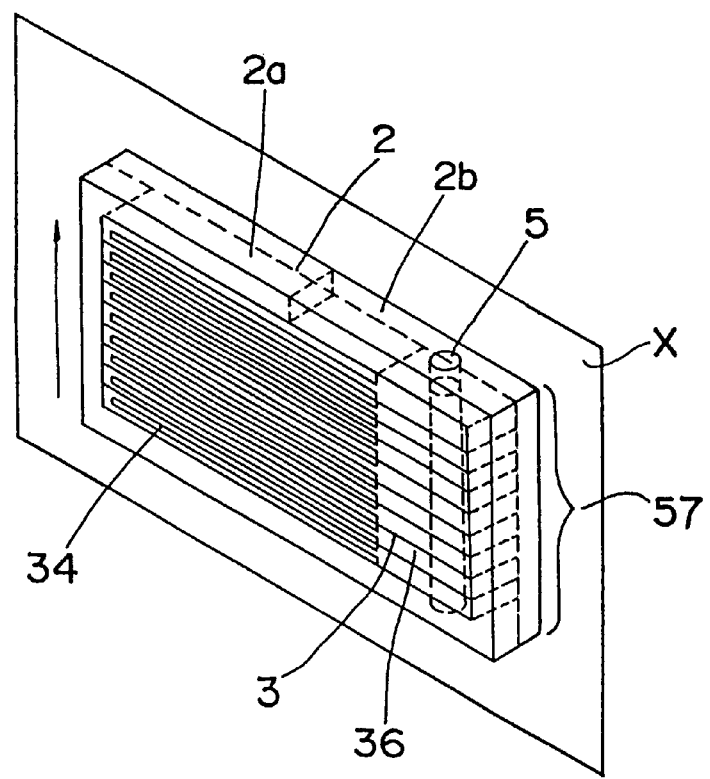
FIG. 2A is a perspective view of a capacitor anode body according to another embodiment of the present invention.
Figure 2B:
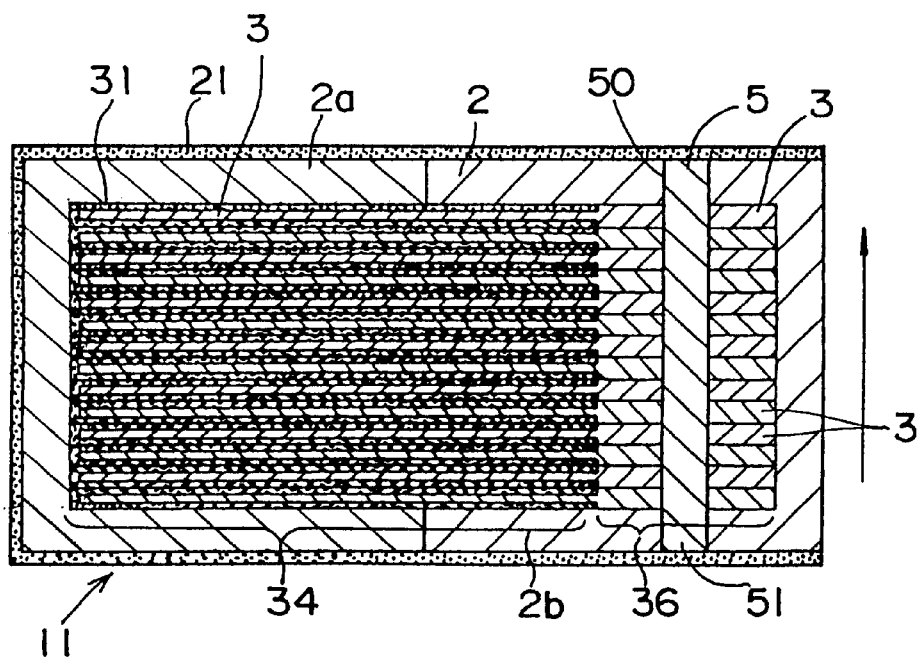
FIG. 2B is a sectional view of the capacitor anode body cut at its center portion in a thickness direction thereof.

FIGS. 2A and 2B show an example of an embodiment utilizing another anode conductor. An anode conductor 5 is disposed so that a metal wire 51 passes through a through hole piercing in the laminating direction both the fixing frame 2 of aluminum and the metal surface portions 36 of the sheets of the anode valve metal foil 3 forming the laminate. The conductor 5 ensures electric connection between the aluminum frame and respective sheets of anode valve metal foil 3. As for the anode conductor 5, a wire made of aluminum which is the same material as that of the frame 2 is preferably utilized.

Figure 7B:
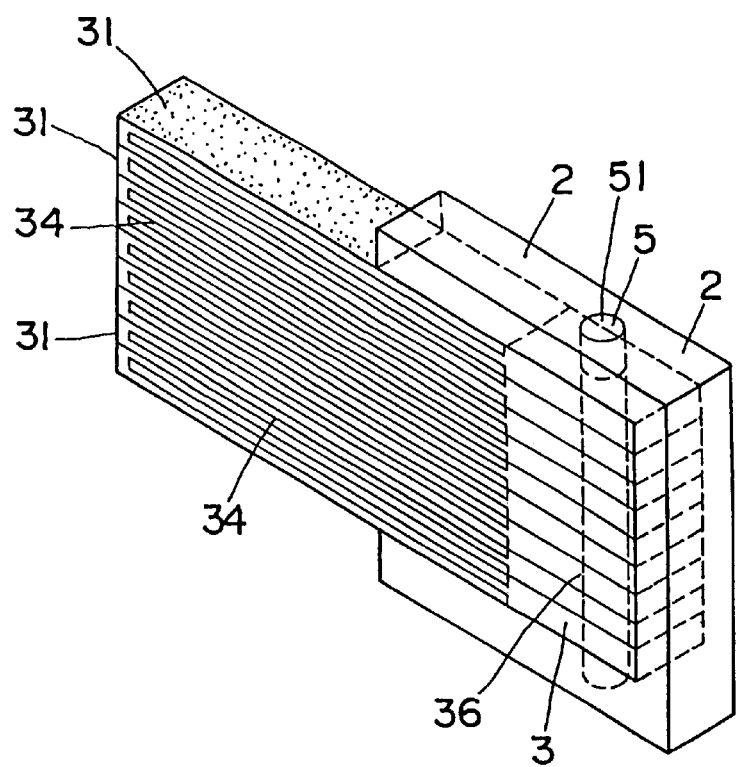

FIG. 7B shows another example of the fixing frame arrangement. The fixing frame 2 may be a half periphery frame using only one channel of metal such as aluminum instead of a closed shape. Mainly the metal surface portions 36 of the laminate of sheets of the anode valve metal foil 3 may be sandwiched in the lateral direction between portions of the fixing frame 2 and fixed. In this case as well, the conductor 5 of metal wire may pass though the metal surface portions 36 of the laminate of sheets of the anode valve metal foil 3 to ensure conduction between the fixing frame 2 and the sheets of the anode valve metal foil.

As evident from the foregoing description, a sufficient dielectric oxide film can be formed as far as the inside of the anode body. Capacitance possessed by the entire anode body can be taken out more efficiently. The anode body can also meet the requirement of reduction in size issued from the market. And it is possible to provide a capacitor anode body capable of lowering the impedance when it is used in an electrolytic capacitor which is the final product.

Embodiment 2

Figure 3:
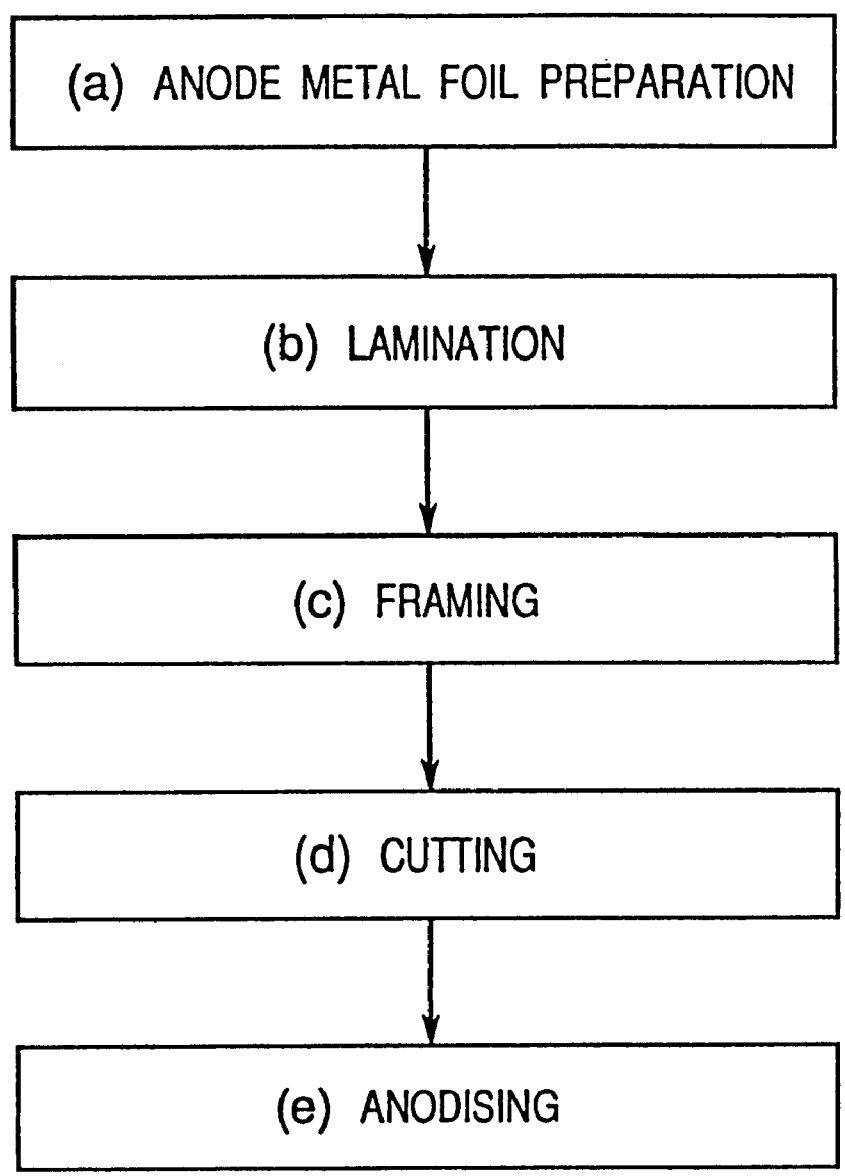
FIG. 3 is a flow chart showing steps of a method for fabricating a capacitor anode body according to an embodiment of the present invention.

A method for producing an anode body according to the present invention is shown in FIGS. 3 and 4. The method comprises steps of (a) forming an oxide film on each of sheets of the valve action metal and thereby making sheets of anode valve metal foil, (b) laminating a number of sheets of the anode valve metal foil to a laminate material, (c) attaching a fixing frame material of valve action metal to a laminate and thereby unifying the laminate, and (d) cutting the lengthy laminate and separating it into a large number of anode bodies each having a desired shape.

In the step (a) of making the anode valve metal foil 3, lengthy sheets of metal foil of aluminum, tantalum, or the like are utilized.

A part of surface of each of these sheets of metal foil in the longitudinal direction is left as a metal surface portion 36. A remaining part is subjected to surface roughening, and a dielectric oxide film is anodized thereon to form an oxide film portion 34. Anode valve metal foil is thus formed (FIG. 3).

In this step (a) of making the anode valve metal foil, there may be adopted such a method that surface roughening of the entire surface and formation of an oxide film thereon are conducted and then only a part of the surface is polished to remove the oxide film, expose the surface of metal, and form a metal surface portion 36.

For the etching method for roughening the surface of the valve metal foil, a conventional technique such as AC etching or DC etching in an electrolyte can be used. For forming the dielectric oxide film 31, a method of constant voltage anodizing and constant current anodizing are used in a conventional anodizing solution.

Figure 4A:
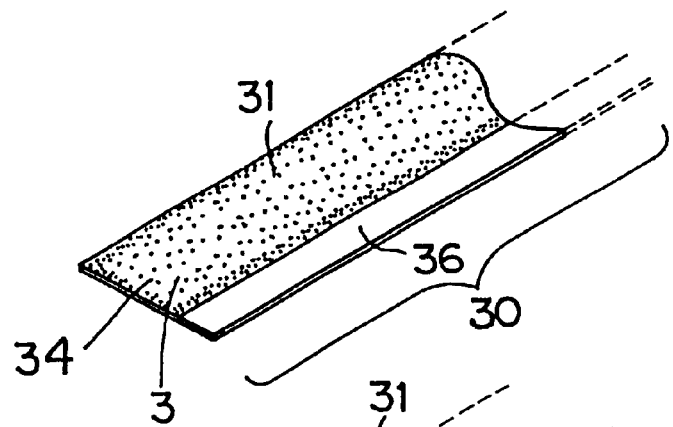
FIGS. 4A–4D are perspective views showing a method for fabricating a capacitor anode body according to an embodiment of the present invention.
Figure 4B:
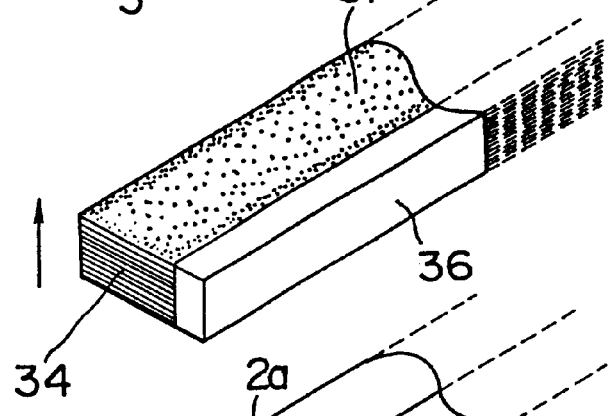

In step (b) of laminating sheets of anode valve metal foil, a large number of sheets of the anode valve metal foil 3 obtained in the step (a) are laminated while bringing the metal surface portions 36 having no dielectric oxide films 31 formed thereon into contact with each other as shown in FIG. 4B.

Figure 4C:
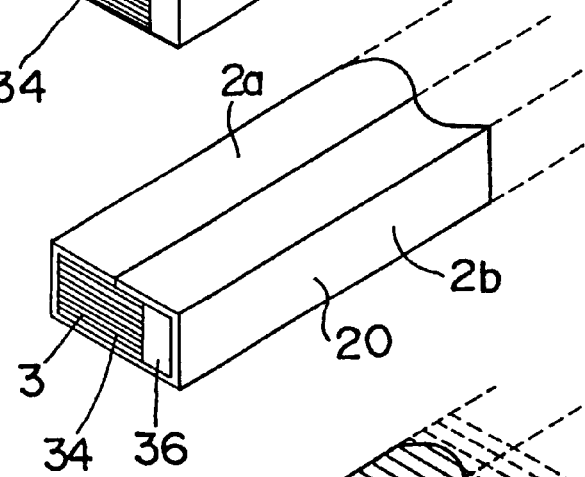

In next step (c) of attaching the fixing frame material 20 to the laminate, valve action metal is preferably used. In this example, two metal channels 2a and 2b are used. As shown in FIG. 4C, the laminate is fitted into the two channels integrally.

In attaching the fixing frame material 20 to the laminate, it is desirable to force the fixing frame material 20 against the laminate material by means of a press, or the like, as occasion demands. The metal foil laminate is interposed in the laminating direction between portions of the fixing frame material, ensuring electric connection and physical fixing between sheets of anode valve metal foil and between the anode valve metal foil and the fixing frame.

Figure 4D:
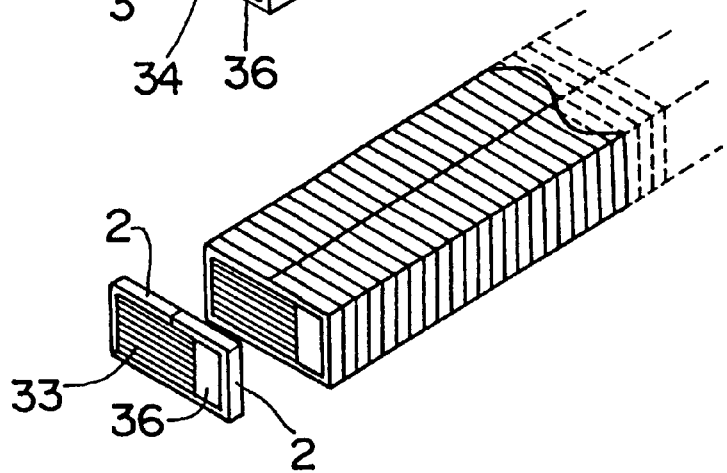
Figure 5:
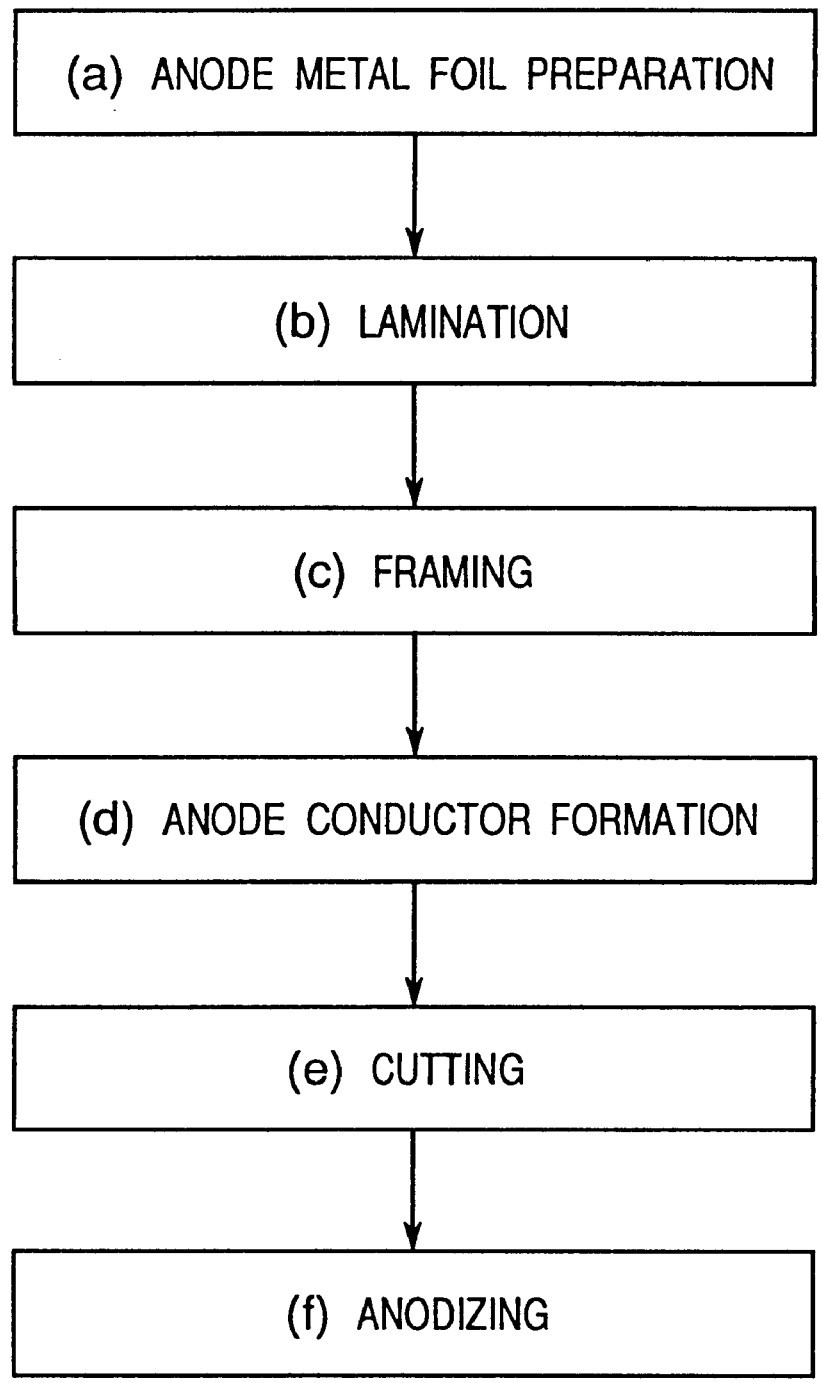
FIG. 5 is a flow chart showing steps of a method for fabricating a capacitor anode body according to another embodiment of the present invention.

In step (d) of cutting the framed laminate material, the laminate material fixed by the channels serving as the fixing frame material 2 is sliced at predetermined intervals by a dicing saw (FIG. 4D). A plurality of anode body elements each having a necessary shape are thus obtained then, by polishing the sliced faces of the valve metal foil in the side of the laminate. Another method such as grinding may be adopted to separate the laminate material into laminates.

In step (e) of re-anodizing anode body elements, the anode body elements each having a desired shape obtained in the above described step (d) are re-anodized. An aluminum oxide film for a dielectric oxide film 31 is formed by re-anodizing the anode valve metal foil. This re-anodizing is performed in the similar manner to the anodizing method used in the above d step (a), such as the method of constant voltage anodizing or constant current anodizing in an anodizing solution, is utilized.

Finally, the metal frame is polished on a part of the outside on which a terminal portion 51 is formed, finally, the capacitor anode body being obtained, as shown in FIG. 1.

FIG. 5 and FIGS. 6A to 6E show another embodiment including an anode conductor. Its fabrication step (d) includes forming a conductor for electrically connecting the metal surface portions of sheets of anode valve metal foil to the fixing frame material of valve action metal.

Figure 6A:
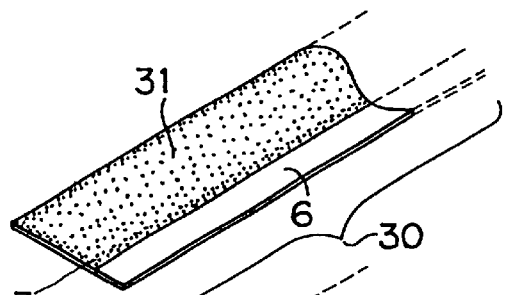
FIGS. 6A–6E are perspective views showing a method for fabricating a capacitor anode body according to another embodiment of the present invention.
Figure 6B:
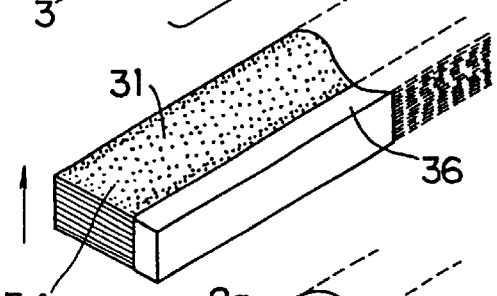
Figure 6C:
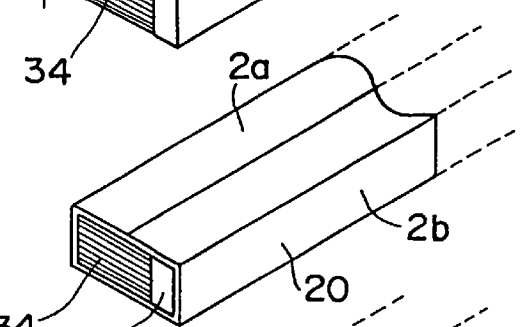
Figure 6D:
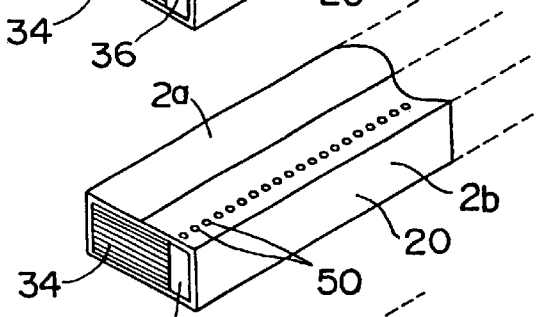

In this step shown in FIG. 6D, through holes 50 are formed passing through the fixing frame material 20 and the metal surface portions 36 in sheets of the anode valve metal foil 3 at fixed intervals longitudinally. Subsequently, metal wires are inserted in each through hole 50 as a conductor 5. For such a metal wire, aluminum, tantalum, or titanium is utilized. The metal wire electrically connects the fixing frame 20 of valve action metal with all sheets of the anode valve metal foil 3.

Figure 6E:
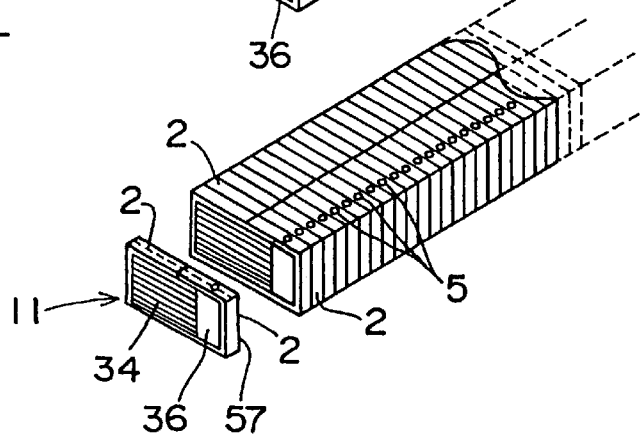

In step (e) of cutting, the fixing frame material and the laminate are sliced to form thin anode bodies (FIG. 6E). The laminate is sliced at such positions that each of sliced anode bodies contains at least one conductor 5. In this case, the laminate material is diced between the adjacent metal wires inserted, resulting at least one conductor wire being passed through each slice to fix.

Thus, the section face of the slice is utilized as the side face X of the laminate. By polishing the section face, an exposed surface X is obtained. A plurality of anode body elements each having a desired shape are obtained.

Subsequently, in the same way, the sliced laminate is anodized, and thereby dielectric oxide films 21, 31 are formed on the sliced side of the anode body.

The above described steps are conducted sequentially. Lastly, the surface of the metal fixing frame is polished, and the metal surface is exposed in a part of the anode body to form a connection end face. Finally, a capacitor anode body as shown in FIGS. 2A and 2B is obtained.

EXAMPLE 1

In the etching step (a), a strip of aluminum (made of a soft temper material) having a purity of 99.98% or more, with thickness of 100 μm and width of 20 mm, was utilized for valve metal foil. Only a width of 15 mm from the edge of the strip-shaped foil was etched to roughen the surface area. In etching, the strip-shaped foil was immersed in a 10 wt % hydrochloric acid solution at a temperature of 30° C. and supplied with AC current of 20 Hz at the current density of 0.2 A/cm$^2$.

Subsequently, only the etched portion was anodized under the conditions of anodizing solution of an ammonium adipate 5 wt % aqueous solution, anodizing solution temperature 60° C., and anodizing voltage 12V.

On parts of each of sheets of the metal foil, the aluminum metal surface portion 36 having a width of 5 mm and serving as the metal portion 36 and the oxide film portion 34 having a width of 15 mm were formed as shown in FIG. 3. In the lamination step (b), 50 layers of the strip-shaped anode valve metal foil 3 are piled so that the metal surface portions 36 may lie one upon another, resulting in a laminate.

In the framing step (c), two channels were used, which had an channel opening distance of 5 mm and a thickness of 1 mm made of aluminum with purity over 99%. The laminate material obtained in the step (b) was fitted into a channel space as illustrated so that the channels of the fixing frame material 20 of valve action metal were electrically connected to the anode layer of the anode valve metal foil 3 by individual metal portions 36.

In the cutting step (d), the framed laminate material was cut together with the fixing frame material at intervals of 2 mm in a direction perpendicular to the longitudinal direction by a dicing saw, and then, a large number of slices were obtained. The sections of these slices were polished by sand paper. A large number of anode body elements each having a shape of 7 mm by 22 mm and 2 mm in thickness were obtained.

In the step (e), the obtained anode body elements were re-anodized in the same way as the step (a). On each of surfaces of the channel serving as the fixing frame 2 of valve action metal and aluminum end faces exposed by cutting in the step (d), a dielectric layer 1 was formed.

The metal frame was polished at a part of the metal surface so that the aluminum surface was exposed to be used as a metal terminal portion 57. Finally, a capacitor anode body as shown in FIG. 1A was obtained.

Capacitance of the capacitor anode body obtained in Example 1 was measured at 10 Hz in an ammonium borate aqueous solution having a conductivity of 50 mS/cm. The result was 1052 μF as an average value obtained when ten similar anode body elements were measured.

As a result of the steps heretofore described, it became possible to form a sufficient dielectric oxide film as far as the inside of the anode body. The capacitance possessed by the entire anode body could be taken out efficiently. And a small-sized capacitor anode body was obtained.

EXAMPLE 2

The above described steps (a), (b) and (c) were made the same as those of Example 1. A fixing frame material 20 was thus attached to the laminate.

Subsequently, in conductor connection step (d), a large number of through holes of 1 mm inner diameter passing through the aluminum channel and the metal portions 36 of the anode valve metal foil 3 were formed in the laminate fixed by the fixing frame material 20. In individual through holes, aluminum wires serving as the conductors 5 were inserted closely.

In the step (e) of cutting into a plurality of anode body elements each having an arbitrary shape, a laminate having the aluminum channels serving as the fixing frame material 20 and the aluminum wire of the conductor 5 obtained in the step (d) was cut at such positions that each element after cutting included the conductor 5, by using a dicing saw. Resultant slices were polished by using sand paper. A plurality of elements each having a shape of 7 mm by 22 mm, with thickness 2 mm were thus obtained.

Capacitance of the capacitor anode body obtained in this Example 2 was measured at 10 Hz in the above described ammonium borate aqueous solution. The result was 1105 μF (an average value obtained when ten similar anode body elements were measured).

As a result of the steps heretofore described, it became possible to form a sufficient dielectric oxide film as far as the inside of the anode body. The capacitance possessed by the entire anode body could be taken out efficiently. And it becomes possible to provide a small-sized capacitor anode body. Furthermore, in the capacitor anode body according to the present Example 2, the aluminum wire is formed as the conductor 5. It is evident that as a result the electric connection between sheets of the anode valve metal foil and the aluminum channel serving as the fixing frame 2 becomes sure and highly reliable.

Embodiment 3

Figure 8:
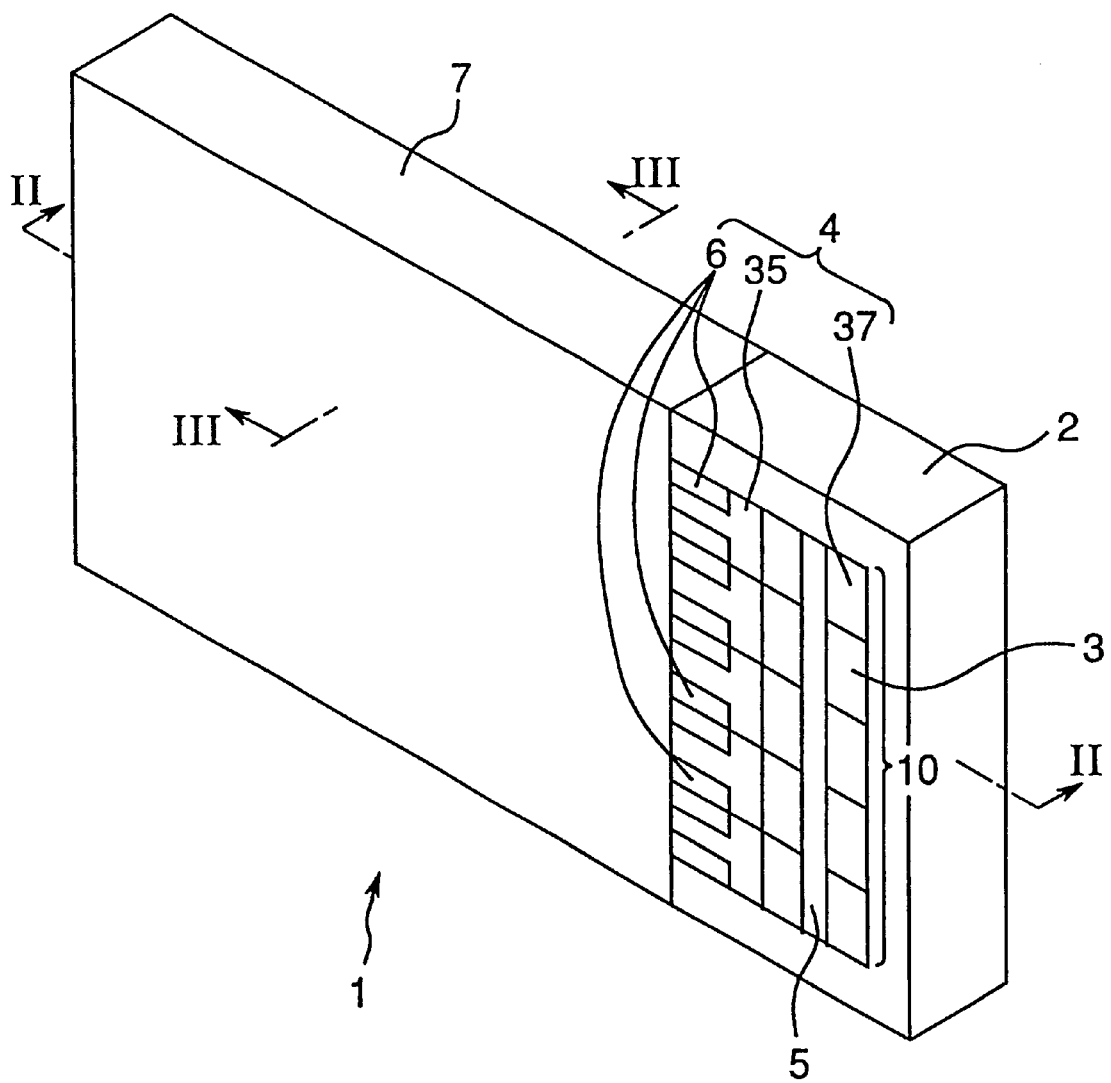
FIG. 8 is an perspective view of an electrolytic capacitor according to an embodiment of the present invention.
Figure 9:
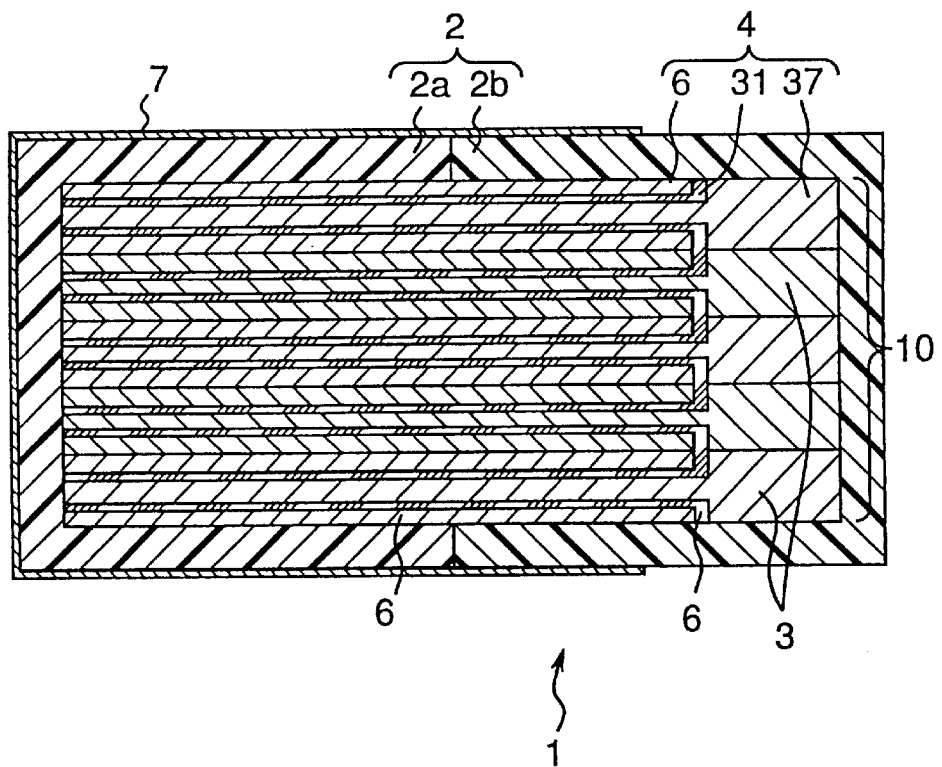
FIG. 9 is a sectional view of the electrolytic capacitor shown in FIG. 1.

An electrolytic capacitor of the present invention includes a fixing frame 2 having a narrow width and a rectangular external shape, and a laminate 10 having periphery surrounded by the fixing frame, as shown in FIGS. 8 and 9. The laminate 10 is formed by laminate a large number of sheets 3 of anode valve metal foil (aluminum foil in this example) each having an oxide film anodized in a part of its surface.

On the surface of each of sheets of the anode valve metal foil 3, an oxide film portion 34 and a metal surface portion 36 are formed separately. The metal surface portions of respective sheets of valve metal foil 3 are brought into contact with each other by an anode conductor so as to be electrically connected to each other.

Figure 10:
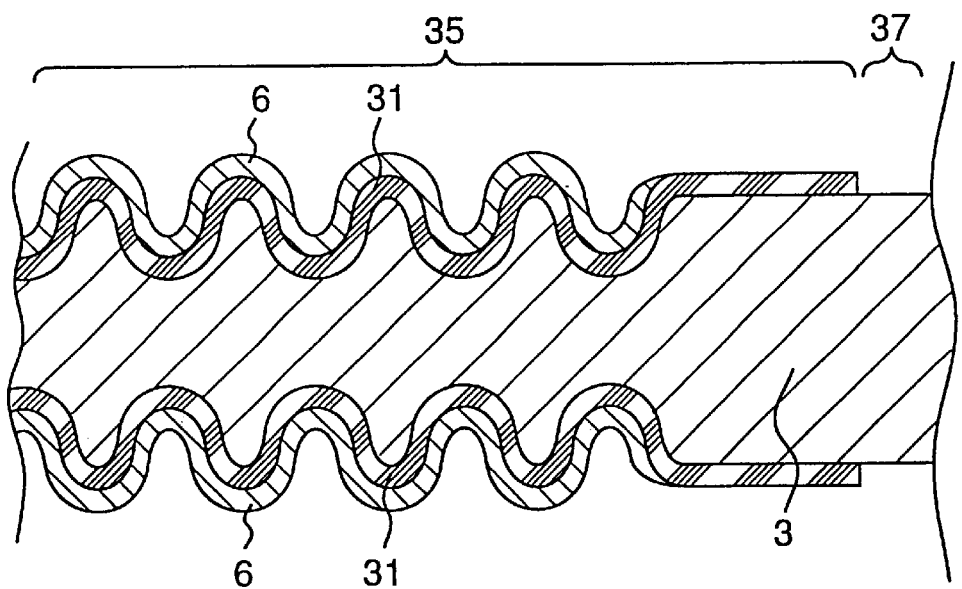
FIG. 10 is an enlarged schematic diagram of valve metal foil.

On the other hand, a conductive polymer layer serving as a cathode layer is formed on the surface of the oxide film portion 34 of each of sheets of the valve metal foil 3. FIG. 10 shows an enlarged view of a part of the surface of each of sheets of the anode valve metal foil made of aluminum.

In the oxide film portion 34, a film 31 of aluminum oxide, which is a dielectric layer, is formed on the surface of the foil that is subjected to surface roughening. On the dielectric layer, a conductive polymer layer 6 serving as a cathode layer is applied.

In FIG. 8, a cathode conductor 7 is stuck to the periphery of the laminate 10 including the oxide film portions 34 of each of sheets of the valve metal foil 3. Electric connection to the cathode layer is thus conducted.

In this electrolytic capacitor, wiring leads are connected an anode conductor 5 and a cathode conductor 7, respectively.

In an electrolytic capacitor 1, the conductive polymer layer 6 has a resistance value greater than that of a cathode conductor 7. Therefore, the impedance of the electrolytic capacitor 1 is determined by the resistance value of the conductive polymer layer 6 and the path length in the conductive polymer layer 6 for pulling out electric charge electrified on the oxide film 31 of the electrolytic capacitor 1. For lowering the impedance of the electrolytic capacitor 1, therefore, it is effective to shorten the path length of electric charge in the conductive polymer layer 6 located between the surface of the oxide film 31 and the cathode conductor 7. For the reason heretofore described, the path of the electric charge can be physically minimized by disposing the cathode conductor 7 on a side face of longer side of the laminate 10. Therefore, the impedance of the electrolytic capacitor 1 can be lowered.

Furthermore, the impedance of a capacitor part taking a chip form fabricated by attaching metal terminals to the electrolytic capacitor of the present embodiment and molding it by resin or the like is also lowered.

Instead of the structure having a cathode conductor on a side face containing the longer side of each of sheets of the valve metal foil, however, an electrolytic capacitor of the present invention may have such a structure as to contain a cathode conductor on a side face containing a short side of each of sheets of the valve metal foil.

Instead of the above anode conductor 5 formed of metal foil connected to a side face of the laminate, anode regions of respective sheets of valve metal foil forming the laminate may be welded to cause conduction. In this electrolytic capacitor, it is not necessary to connect the anode conductor to the side face of the laminate. Therefore, it is possible to prevent an increase in thickness of the electrolytic capacitor and further reduce the size of the electrolytic capacitor.

Embodiment 4

Figure 12:
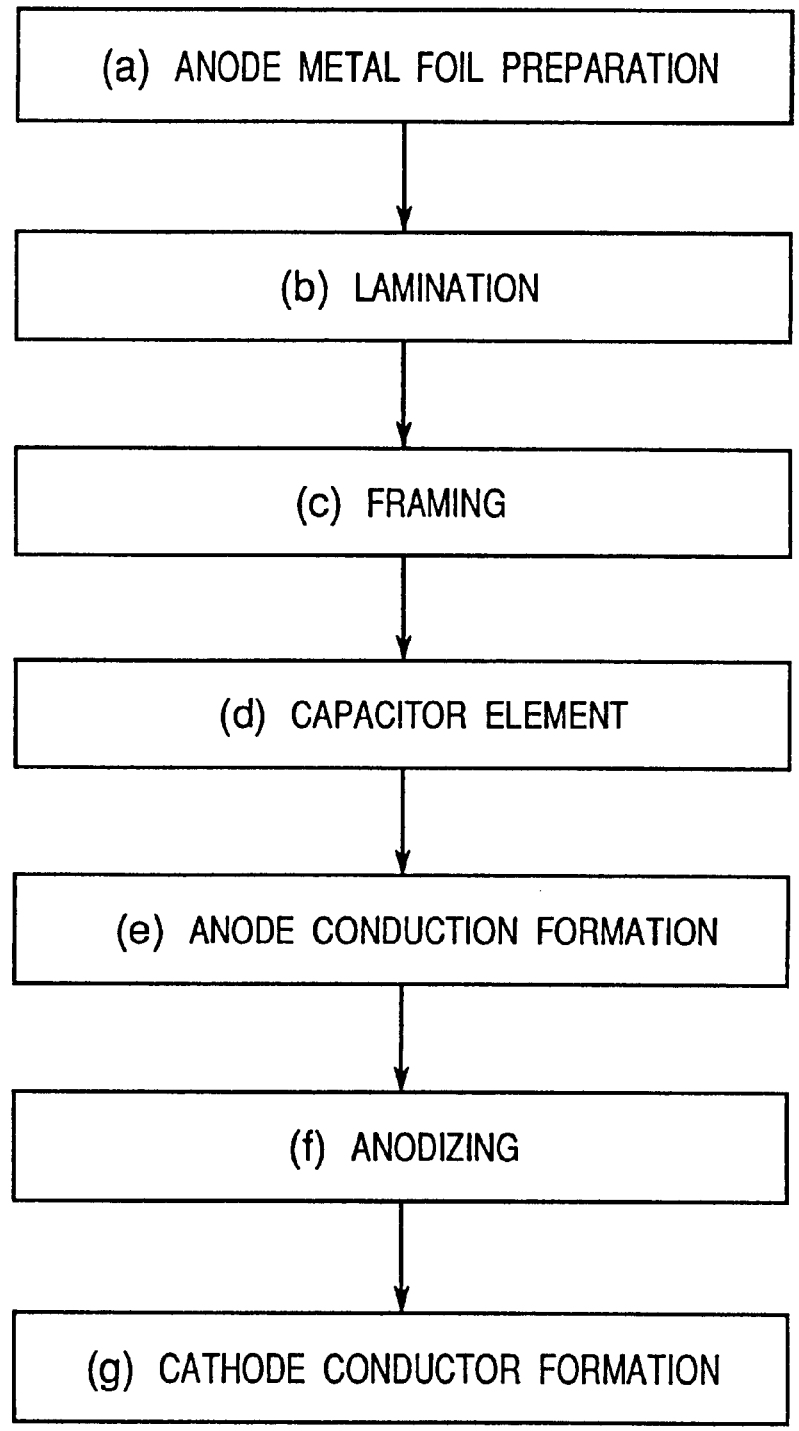
FIG. 12 is a flow chart showing fabrication steps of an electrolytic capacitor according to an embodiment of the present invention.

A method for fabricating the electrolytic capacitor 1 will now be described below. As shown in FIG. 12, the electrolytic capacitor 1 is fabricated by: (a) preparing anode valve metal foil to roughen sheets of primary valve foil on a predetermined region of each sheet and form a conductive polymer layer on the oxide films; (b) laminating plurality of sheets of the valve metal foil to a laminate material; (c) framing the laminate material for attaching a fixing frame material to the laminated sheets of the metal foil; (d) cutting the framed laminate material fixed by the fixing frame material into slices each having predetermined dimensions, and then obtaining a capacitor element having a laminate of pieces of valve metal foil; (e) connecting an anode conductor to the capacitor element; (f) anodizing the capacitor element having the anode conductor; and, (g) forming a cathode conductor kept in contact with the conductive polymer layer of each of sheets of the valve metal foil of the capacitor element.

Except the step of forming the conductive polymer layer via the oxide film to obtain a capacitance portion, the above described steps as far as the cutting step are basically the same as the fabrication steps of the anode body described earlier.

Figure 11A:
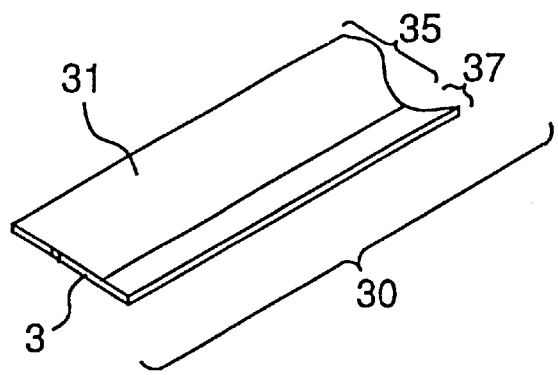
FIGS. 11A–11D are perspective views showing fabrication steps of an electrolytic capacitor according to an embodiment of the present invention.

For forming the portion performing electric capacitance function on every sheet of primary valve metal foil 30 in the metal foil preparation step (a) as shown in FIG. 11A, the surface of each of sheets of valve metal is divided into a cathode region 35 on which a conductive polymer layer should be formed via an oxide film, and an anode region 37 other than the cathode region 35. As shown in FIG. 10 conceptually, the sheets of primary valve metal foil 30 has a cathode region 35 having a conductive polymer layer 6 formed thereon via an oxide film 31, and an anode region 37 having no oxide film formed thereon.

Both obverse and reverse of the cathode region 35 extending in the longitudinal direction of the primary valve metal foil 30 are subjected to surface roughening. Subsequently, constant voltage anodizing processing is effected in an anodizing solution. Thereby, an oxide film is formed on each of the obverse and reverse of the cathode region 35. Furthermore, on the oxide film, a conductive polymer layer is formed. In this way, a capacitance portion formed of the cathode region 35, the conductive polymer layer, and the oxide film sandwiched in between the cathode region 35 and the conductive polymer layer is formed on each of sheets of the primary valve metal foil 30 beforehand.

An object of conducting surface roughening on the cathode region 35 of the primary valve metal foil 30 is to increase the surface area of the cathode region 35 and thereby increase the capacitance of the capacitance portion. The surface roughening processing may be omitted, and a conductive polymer layer may be formed on a flat cathode region 35 via an oxide film.

Figure 11B:
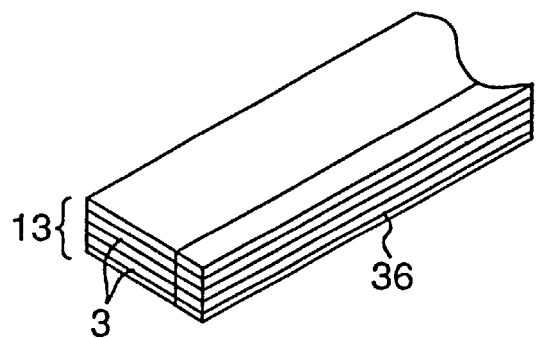

As shown in FIG. 11B, the laminating step is to laminate a plurality of sheets of the primary valve metal foil 30 so the cathode region 35 of the primary valve metal foil 30 may face each other, and thereby forming a laminate material 13.

Unlike FIG. 11A, the anode region 37 formed in the method of producing electrolytic capacitor according to the present invention may not be set. For example, each of the sheets of the primary valve metal foil may be roughened on its surface, and the oxide film 31 and the conductive polymer layer 6 may be formed on said surface.

Figure 11C:
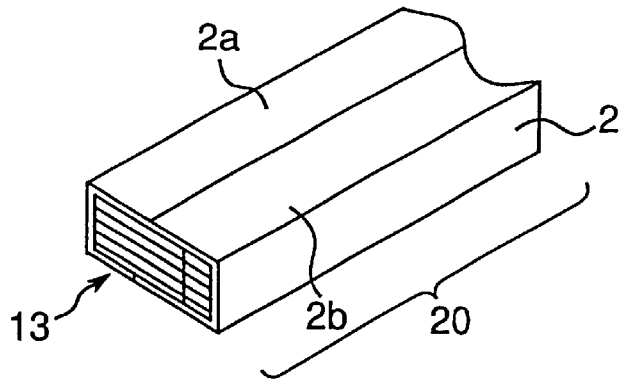

In the framing step following the lamination step as shown in FIG. 11C, a side face including a short side of the laminate material 13 is exposed. From one of longitudinal side faces, the laminate material 13 is pressed by a channel 20 serving as a primary frame member. From the other of longitudinal side faces, the laminate material 13 is pressed by a fixing frame material member 20. In this way, the top and bottom surfaces of the laminate material 13 are interposed in between a closed fixing frame 2 formed by fixing frame materials 20 and 20 each having a half periphery shape. A fixing frame material member 20 fixes a plurality of sheets of the primary valve metal foil 30 in the laminating direction (a thickness direction of the primary valve metal foil 30).

As for the fixing frame material 20, a metallic or nonmetallic materials can be used as described above. In consideration of cutting the primary valve metal foil 30 in such a state that the fixing frame material 20 is fixed, the nonmetallic material may be made synthetic resin which can be easily cut. For example, acrylic resin is preferred.

Furthermore, as for the metallic material, valve action metal can be utilized. It is taken into consideration that a current flows through the fixing frame material 20 when anodizing the primary valve metal foil 30 fixed by the fixing frame material 20. Because in the anodizing step the fixing frame material having valve action metal as its main ingredient does not dissolved into an anodizing solution, but an insulative oxide film is formed on the surface. Aluminum or its alloy is utilized as fixing frame material.

Also, it is possible to use a material capable of being subjected to plastic deformation for the fixing frame material, fix the laminate by using the fixing frame material, and press the laminate of the valve metal foil together with the fixing frame material by using a press or the like. It is possible to physically fix the sheets of the primary valve metal foil with certainty. Furthermore, since the valve metal already has a polymer layer serving as the cathode layer, it is possible to compress the volume of sheets of the valve metal foil each having capacitance by pressing the valve metal foil. As a result, an electrolytic capacitor having large capacitance per unit volume can be fabricated.

Figure 11D:
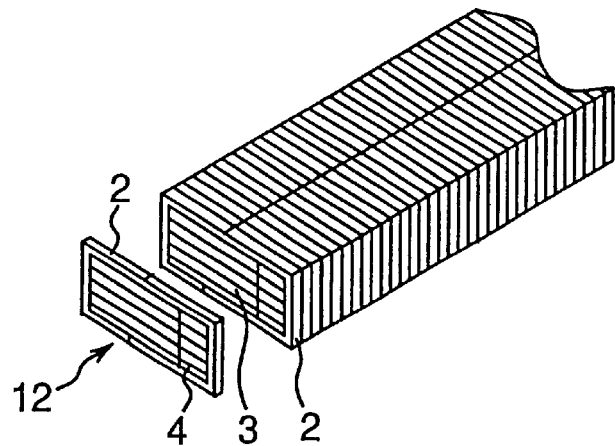

In the cutting step as shown in FIG. 11D, the laminate of the primary valve metal foil 30 fixed by the fixing frame material is cut in a direction oblique or perpendicular to the longitudinal direction by using a dicing saw. A large number of capacitor elements 12 are thus obtained. Each capacitor element 12 thus obtained includes a laminate formed of laminated sheets of the valve metal foil 3 and cut so as to have a predetermined thickness dimension. The periphery of this laminate is fixed by cut fixing frame material 20.

Furthermore, in the laminate, sheets of valve metal foil are laminated so that conductive polymer layers between the sheets of the valve metal foil will be in contact with each other. Each of sheet to having been cut of the valve metal foil has a rectangular shape and, then, the cut edges of respective sheets of the valve metal foil are exposed from a section of the fixing frame.

Both the cut faces of the sliced laminate compose the side of the laminate including a longer side of the rectangular foil. The side of the laminate exposes the anode and the cathode regions of each of the valve metal foil as well as a section of the conductive polymer layers formed on the oxide film of the anode region.

The anode conductor forming step is to form an anode conductor brought into contact with the side face of the anode region of each in sheets of the valve metal foil exposed at the section of the capacitor element. For the anode conductor, the foil of the valve metal or conductive resin can be utilized. As for the metal foil, metal foil serving as the anode conductor is welded to a part of the side face of the anode region of each of sheets of the valve metal foil. For utilizing conductive paint, it may be applied to the side face of the anode region of each of sheets of the valve metal foil exposed at the section to make the anode regions on the sheets of the valve metal foil conductive with each other.

In any case, the anode conductor is formed so as not to come in contact with the conductive polymer layer.

In the anodizing step following the anode conductor forming step, anodizing processing is conducted on the capacitor element, and thereby an oxide film is formed on the metal section of each of sheets of the valve metal foil exposed at the section.

In the cathode conductor forming step, the cathode conductor covers the side face of the laminate and the fixing frame so as to come in direct contact with the side face of the conductive polymer layer.

The cathode conductor is insulated from the metal section of each of sheets of the valve metal foil exposed at the section of the fixing frame by the oxide film formed by the anodizing processing.

The cathode conductor can be formed of commercially available conductive paste, or a conductive polymer layer containing a conductive substance such as carbon or silver.

In consideration of the fact that the cathode conductor is desired to come in direct contact with the oxide film formed on the side face of the valve metal foil and have an effect of suppressing a leak current of the electrolytic capacitor, conductive polymer, especially poly-pyrrole is desirable.

In the electrolytic capacitor thus formed, an anode conductor 5 is disposed on the side face of a laminate 10, and a cathode conductor 7 is provided so as to cover the side face of the laminate 10 and the side face of the fixing frame 2, as shown in FIG. 8. The anode conductor 5 is insulated from the cathode conductor 7. The laminate 10 is a lamination of rectangular sheets of the valve metal foil 3. The upper face and bottom face of the laminate 10 are sandwiched in between portions of the fixing frame 2, and thereby fixed. As shown in FIG. 9, the fixing frame 2 for fixing sheets of the valve metal foil 3 is formed of two fixing frame members 20 and 20 each having a section of yoke 2a and 2b. The laminate is sandwiched in between these fixing frame members 20 from side faces, and fixed.

As shown in FIG. 8, a side face 4 of the anode region for each of sheets of the valve metal foil 3 is exposed at an opening portion of the fixing frame 2. Furthermore, the anode conductor 5 made of aluminum foil is connected to of the anode region 37 in the side face 4 exposed at the opening portion. Also, the anode conductor 5 and the cathode conductor 7 are insulated from each other via an oxide film 31 formed on each of sheets of the valve metal foil 3.

In the case where the fixing frame 2 is synthetic resin, the anode conductor 5 is not electrically conductive with the cathode conductor 7. In the case where the fixing frame is valve action metal, the anode conductor 5 and the cathode conductor 7 are insulated from each other by the oxide film 31 formed on each of sheets of the valve metal foil 3 and an oxide film 21 formed on the surface of the fixing frame.

Both the anode conductor 5 and the cathode conductor 7 are formed on the same side face (a side face including a longer side of each of sheets of the valve metal foil 3). By the way, in the fixing frame 2 shown in FIG. 8, a single side face opening is provided, and one of side faces of the laminate 10 is exposed from this side face opening portion. However, the fixing frame 2 used in the present embodiment has two side face opening portions opposed to each other, and both side faces of the laminate 10 are exposed from the two side face opening portions.

In the present embodiment, both side faces of the anode region 37 and the cathode region are exposed from the side face opening portions. However, only one side face of each of the anode region 37 and the cathode region may be exposed from the side face opening portions.

As described above, the anode conductor 5 electrically connects the anode regions of respective valve action metals 4, and the cathode conductor 7 electrically connects the conductive polymer layers 6 provided on respective valve action metals 4. By providing such anode conductor 5 and cathode conductor 7 for each of sheets of the valve metal foil 3 forming the laminate 10, capacitance amounts possessed by unit capacitors each having the sheet of the valve metal foil 3, the anode region 34, and the conductive polymer layer 6 are unified.

Furthermore, metallic terminals are separately attached to the anode conductor 5 and the cathode conductor 7. Molding using resin or the like is then conducted. As a result, a capacitor part having a chip shape is completed.

Figure 13:
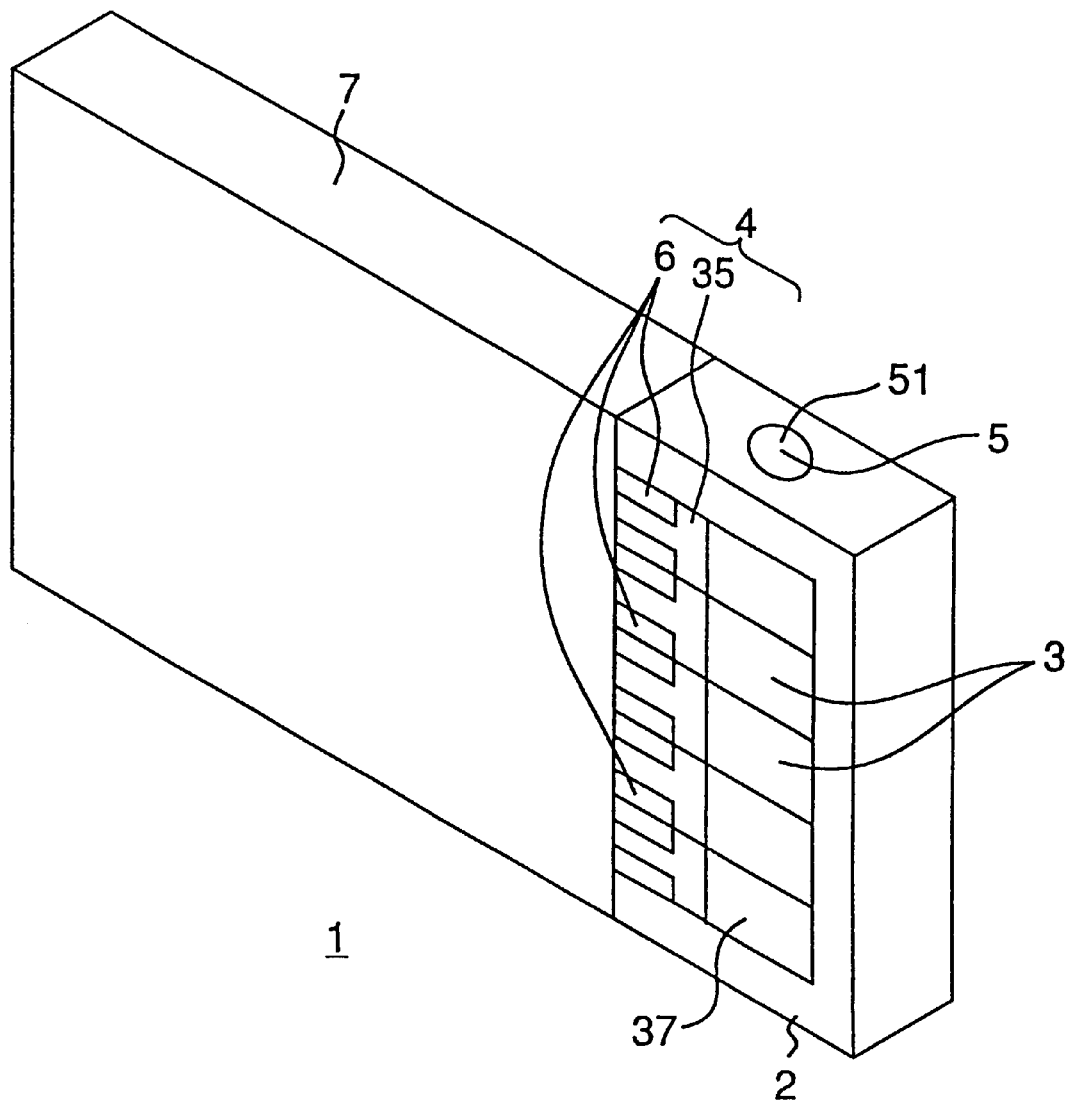
FIG. 13 is an perspective view of an electrolytic capacitor according to another embodiment of the present invention.
Figure 14:
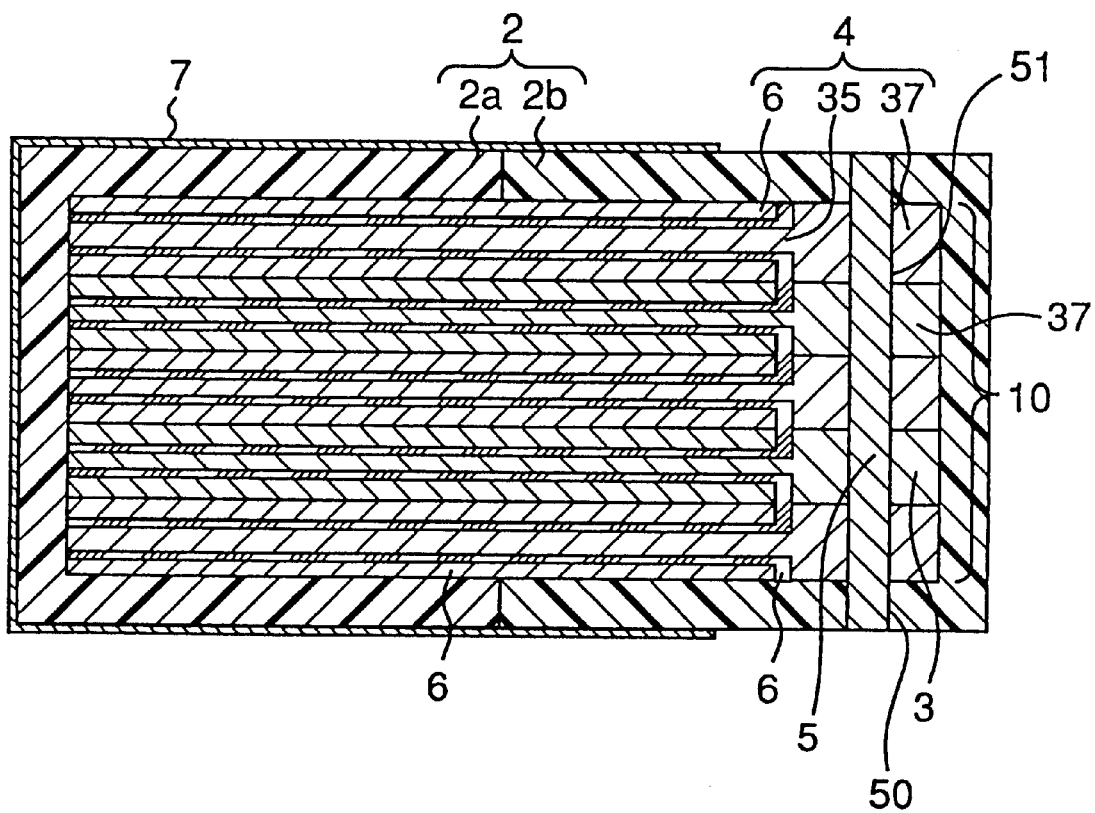
FIG. 14 is a sectional view of the electrolytic capacitor shown in FIG. 13.

In FIGS. 13 and 14, an electrolytic capacitor 1 having an anode conductor formed by a metal wire 51 passing through sheets of the valve metal foil 3 is shown.

Except that the metal wire 51 is used as the anode conductor, the present electrolytic capacitor is the same as the above described.

Since the anode conductor 5 of the electrolytic capacitor 1 is not connected to the side face of the valve metal foil, the thickness of the electrolytic capacitor can be suppressed. Therefore, it is possible to reduce the size of a capacitor part having a chip form fabricated by attaching metal terminals to the electrolytic capacitor of the present embodiment and molding the electrolytic capacitor with resin or the like.

Also, since the anode conductor is incorporated in the electrolytic capacitor 1, the anode region 37 of each of sheets of the valve metal foil 3 can be electrically connected with certainty without the anode conductor peeling off and breaking off.

Figure 15A:
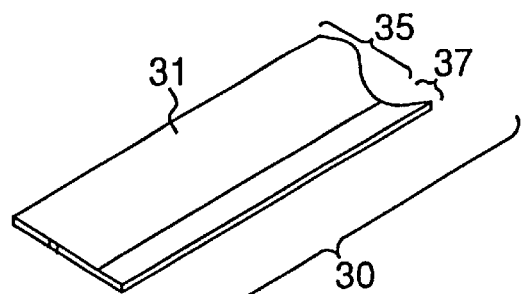
FIGS. 15A–15E are perspective views showing fabrication steps of an electrolytic capacitor according to another embodiment of the present invention.
Figure 15B:
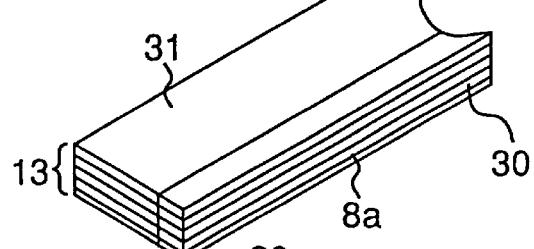
Figure 15C:
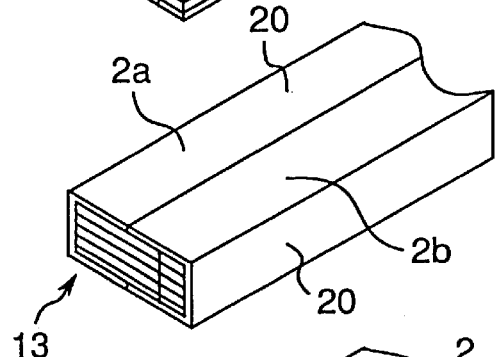
Figure 16:
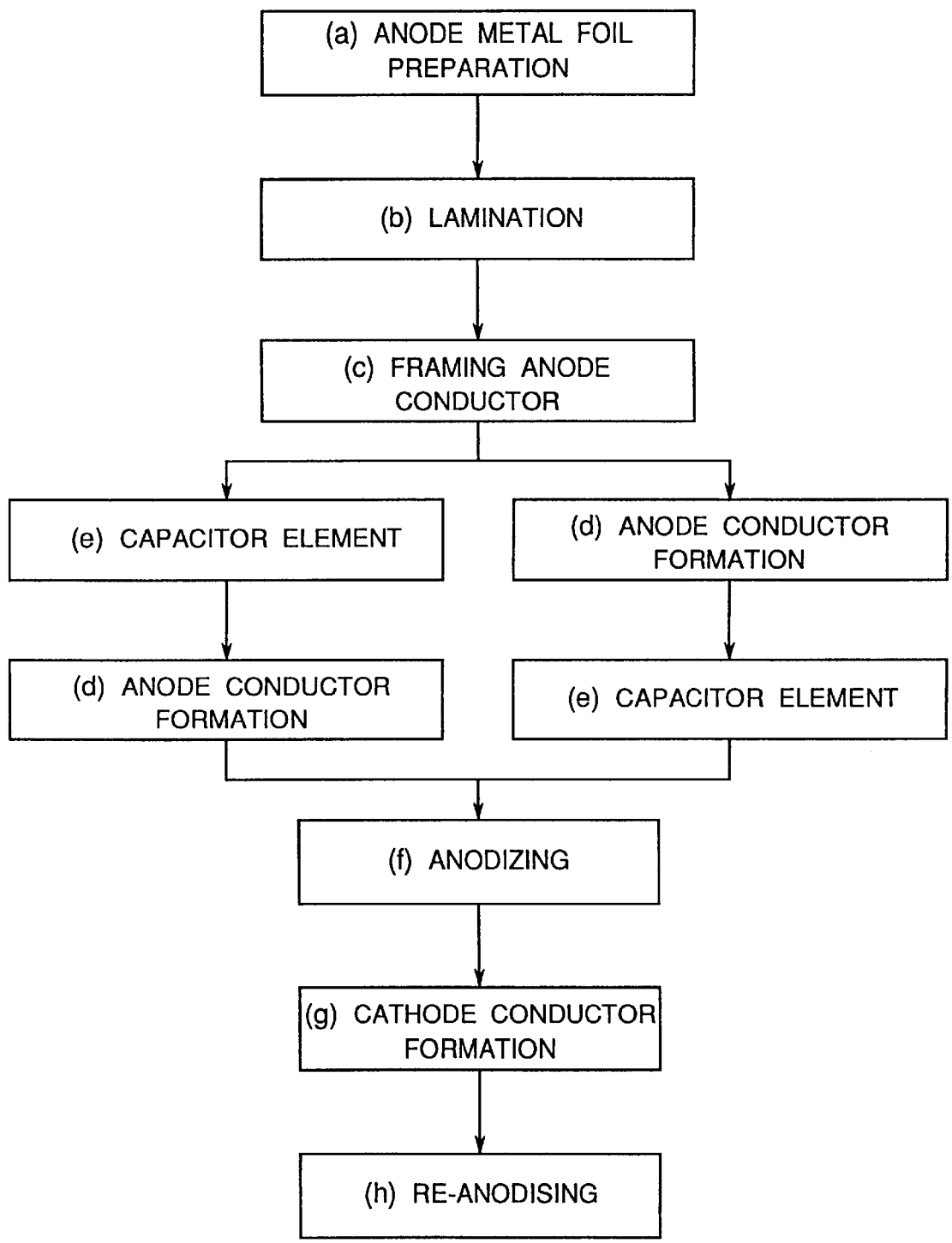
FIG. 16 is a flow chart of fabrication steps of an electrolytic capacitor according to another embodiment of the present invention.

In producing method of the electrolytic capacitor 1 shown in FIG. 16, the anode metal preparation step shown in FIG. 15A, lamination step shown in FIG. 15B, and fixing frame attaching step shown in FIG. 15C are the same as those of the method of producing the electrolytic capacitor described earlier.

Figure 15D:
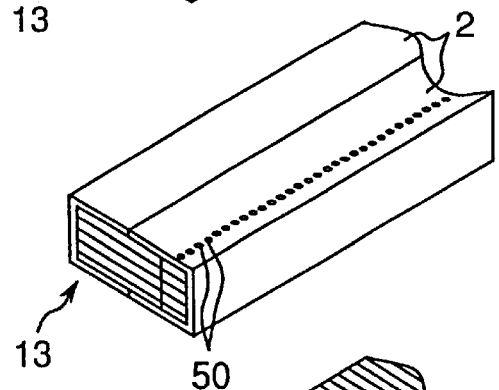

In anode conductor forming step following the fixing frame attaching step, through holes passing through all anode regions 36 of sheets of the primary valve metal foil 30 fixed by the fixing frame material are formed as shown in FIG. 15D. A large number of through holes 50 are formed at predetermined intervals along the longitudinal direction of the primary valve metal foil 30. In these through holes, metal wires 51 are inserted as anode conductors. The metal wires 51 are brought into contact with respective sheets of the valve metal foil 3. Since the conductive polymer layer is not formed in the anode region 37, the metal wire 51 does not come in contact with the cathode layer.

Between through holes having metal wires 51 inserted therein, a laminate of the primary valve metal foil is cut at predetermined intervals and separated into a large number of capacitor elements 12. A reliable means for cutting and slicing the framed laminate material into capacitor elements is the same as that of the second embodiment.

As shown in FIG. 16, it is also possible to cut the primary valve metal foil fixed by the fixing frame material earlier and form capacitor elements each having a predetermined shape (e), and form through holes so as to pass through the anode regions of sheets of valve metal foil forming respective capacitor elements, insert metal wires in the through holes, and form an anode conductor (d).

In the fabrication method of the electrolytic capacitor 1, metal wires passing through the anode regions of sheets of the valve metal foil are inserted. Therefore, electric connection between the anode regions of sheets of the valve metal foil and the anode conductor becomes more perfect. In addition, an effect that the laminate is physically reinforced is also obtained.

It is desirable that the capacitor elements fabricated by the above described embodiment are further subjected to re-anodizing after cathode conductor forming step (g). In re-anodizing step (h), physical defects and chemical defects caused in oxide films of sheets of the valve metal foil during the cathode conductor forming step are repaired by anodizing processing. By using a method similar to the anodizing processing method used in the primary valve metal foil making step described earlier, capacitor elements each having a cathode conductor are anodized. By thus repairing defects caused in the oxide films of sheets of the valve metal foil, the reliability of the electrolytic capacitor becomes higher.

Embodiment 5

As shown in FIGS. 13 to 16, an electrolytic capacitor 1 of another example has a laminate 10 of valve metal fixed by an open-shaped fixing frame 2 taking the shape of a yoke in section. The upper face, lower face, and one end face of the laminate are covered by a yoke. The other end face is not covered by the yoke. A shared conductor is fixed to the uncovered end face. In the same way as the first embodiment, the laminate 10 is obtained by laminating a plurality of sheets of the valve metal foil 3 each having an oxide film 31 and a conductive polymer layer 6 thereon.

Also, the fixing frame 2 has two opposed parallel members, and one end member coupling the parallel members. The fixing frame 2 has an opening portion on the other end. Furthermore, side faces including the longer side of rectangular sheets of the valve metal foil 3, and one end face including the short side are not covered by the fixing frame 2, but exposed. The end face including the short side of the valve metal foil 3 exposed at the opening portion of the fixing frame 2 is used as the anode regions 36.

To the anode regions 36 of sheets of the valve metal foil exposed at the opening portion of the fixing frame 2, an anode conductor 5 made of aluminum foil is connected. In other words, the anode conductor 5 is formed on the side face including the short side of sheets of the valve metal foil 3 of the laminate 10. Furthermore, on the side face including the longer side of the laminate 10, a cathode conductor 7 brought into direct contact with the conductive polymer layer 6 is formed. The anode conductor 5 and the cathode conductor 7 are insulated from each other by an oxide film 31 formed on each valve action metal 4 and an oxide film formed on the surface of the fixing frame 2.

As the fixing frame, an insulative material is used, and the anode conductor 5 is not conductive with the cathode conductor 7 via the fixing frame. Therefore, the anode conductor 5 and the cathode conductor 7 are insulated from each other by the oxide film formed on each valve action metal 4.

Figure 17A:
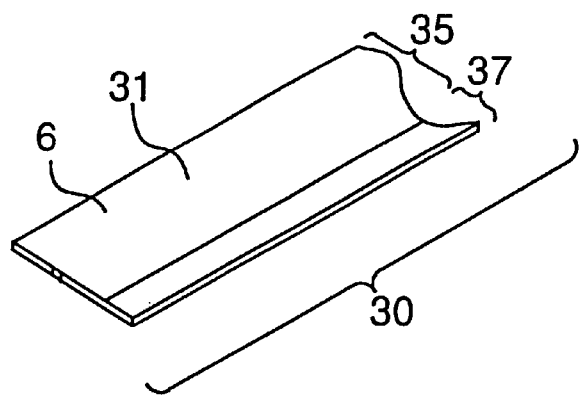
FIGS. 17A–17D are perspective views showing fabrication steps of an electrolytic capacitor according to a fifth embodiment of the present invention.
Figure 17B:
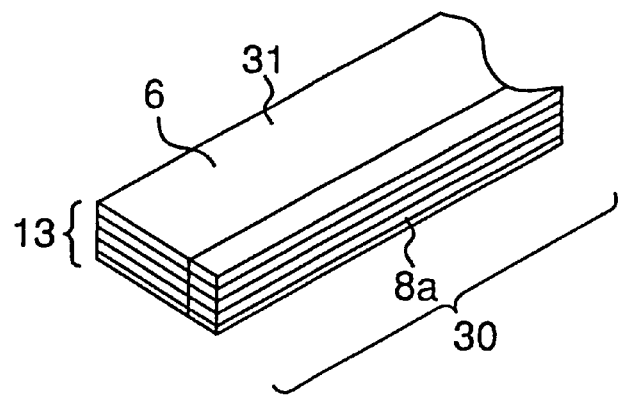

Such an electrolytic capacitor 1 is fabricated along fabrication steps shown in FIG. 12. FIG. 17 shows details of fabrication steps for fabricating the electrolytic capacitor 1. In the fabrication steps of the electrolytic capacitor 1, a primary valve metal foil making step shown in FIG. 17A and a laminating step shown in FIG. 17B are the same as those of the fabrication steps of the electrolytic capacitor described before. In this example as well, the surface of the primary valve metal foil 30 is divided into an anode region 37 and a cathode region 35 as shown in FIG. 17A, in the primary valve metal foil making step. In the anode region 37, the metal surface is exposed.

Figure 17C:
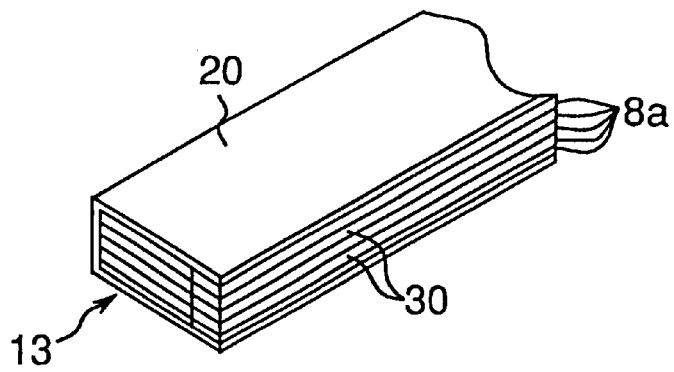

In the fixing frame attaching step following the lamination step, the upper face and the bottom face of the laminate 10 are sandwiched in between portions of a fixing frame 2 taking the shape of a yoke having an opening portion, as shown in FIG. 17C. The laminate is thus fixed. At this time, a side face (multi-layer face) in the longitudinal direction including the anode regions 36 of sheets of primary valve metal foil 30 is exposed from the opening portion of the fixing frame material 2.

Figure 17D:
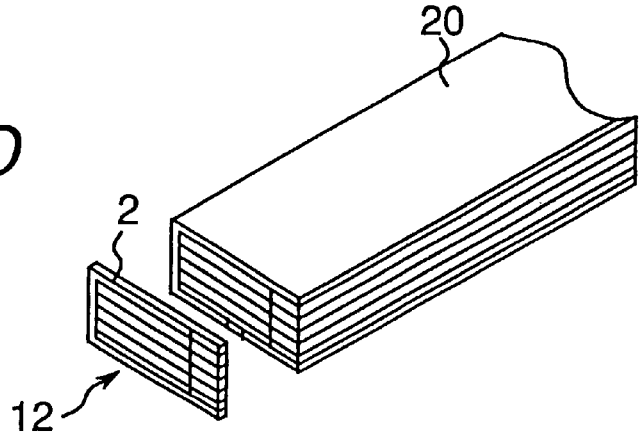

Subsequently to the fixing frame attaching step, as shown in FIG. 17D, sheets of the primary valve metal foil 30 fixed by the fixing frame material 2 are cut at desired intervals in parallel to the short side of the primary valve metal foil 30 by using a dicing saw. A plurality of capacitor elements each having a narrow width are thus formed.

As described above, the laminated sheets of the valve metal foil 3 are cut into rectangular slices. As for the fixing frame 2, the fixing frame material is cut. From an opening portion of the capacitor element including the longer side, therefore, side faces of sheets of the valve metal foil each including the longer side are exposed. And from an opening portion including a short side, side faces of sheets of the valve metal foil each including the short side are exposed. Portions of sheets of the valve metal foil exposed from the end face including the short side are the anode regions 36.

Figure 18:
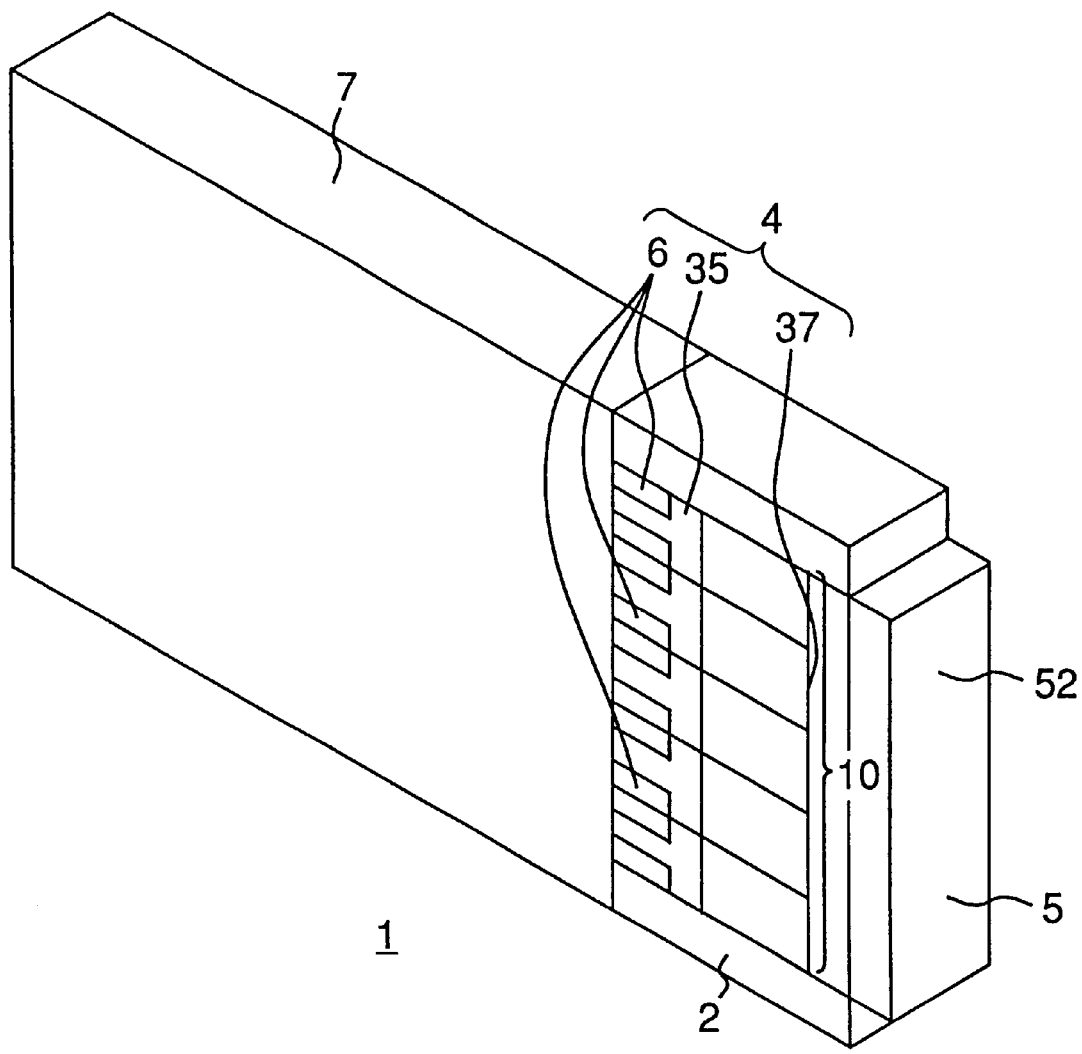
FIG. 18 is an perspective view of an electrolytic capacitor according to an embodiment of the present invention.
Figure 19:
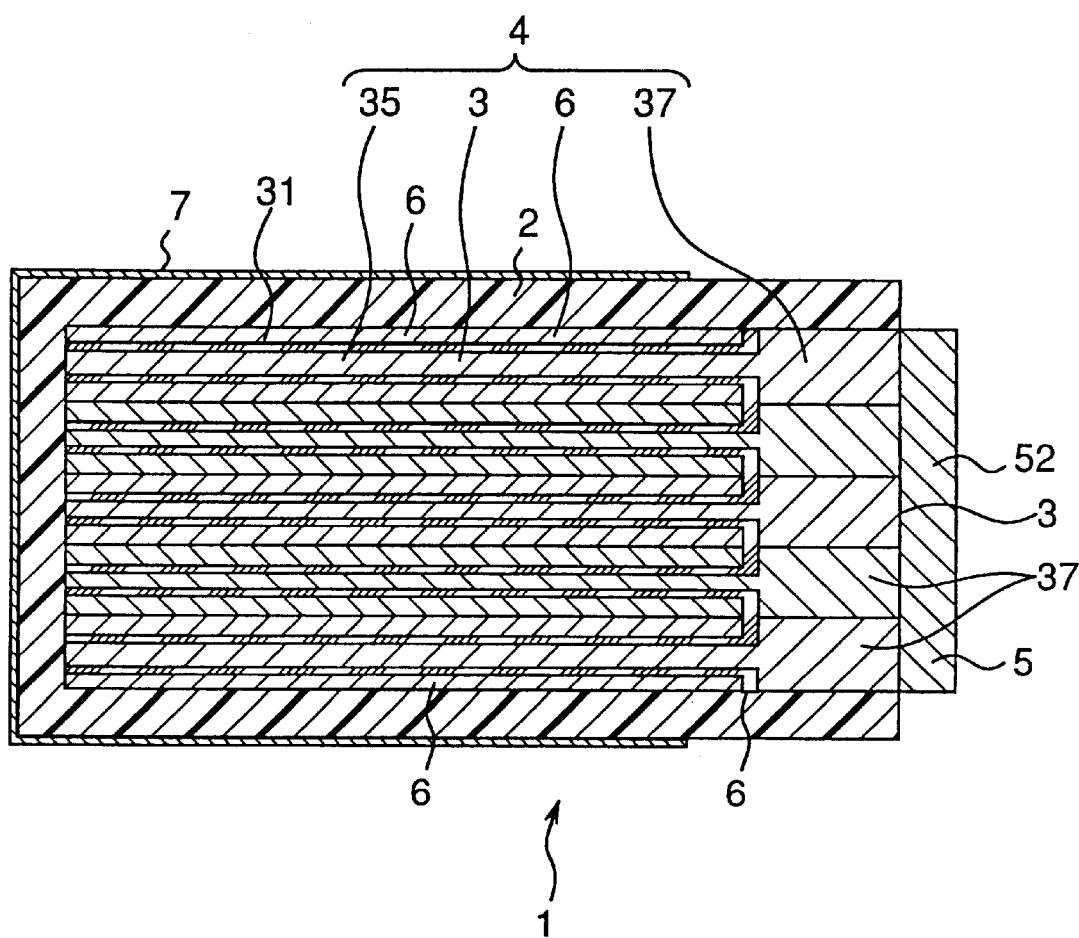
FIG. 19 is a sectional view of the electrolytic capacitor shown in FIG. 18.

Subsequently to the cutting step, an anode conductor 5 is brought into contact with the anode regions 37 of sheets of the valve metal foil 3 exposed at the opening portion of the fixing frame including the short side, and fixed. As for the anode conductor 5, aluminum foil 52 is used and in order to make the anode regions 37 of sheets of the valve metal foil 3 conductive with each other, as shown in FIGS. 18 and 19, the aluminum foil 52 is attached by welding to every of the end faces of the laminated sheets of the anode valve metal foil 3 exposed at the end face portion of the laminate which includes the short sides of the rectangular sheets, without contacting with the conductive polymer layer 6.

After the anode conductor 5 has been formed, the electrolytic capacitor 1 is completed by steps similar to those of the fabrication method of electrolytic capacitor described above. Since the electrolytic capacitor 1 has the anode conductor 5 on the end face of the laminate 10 as shown in FIGS. 18 and 19, the electrolytic capacitor 1 can be made further thinner and more compact.

As for the method for forming the anode conductor, further variations are possible. Instead of the above described method, metal foil serving as the anode conductor 5 may be attached to the laminate beforehand in such a state as to be framed by the fixing frame material, and a resultant framed laminate may be cut to separate into narrower-width capacitor elements having the metal foil 52 for the anode conductor 5 connects the anode regions of sheets of the valve metal foil. In other words, the cutting step and the anode conductor forming step may be reversed in order.

As for the anode conductor, it is possible to make the anode regions 36 conductive with each other by melting the side faces of sheets of the valve metal foil 3 including the short side by means of welding, without using the metal foil.

Furthermore, in this embodiment, the side face including the longer side of the primary valve metal foil 30 is utilized as the anode region. By using sheets of the primary valve metal foil 30 each subjected to surface roughening and anodizing processing on its entire surface, however, the conductive polymer layer 6 may be formed. In this way, it is possible to expose the metal portion only at the end face including the longer side of the primary valve metal foil 30 (i.e., at the end face of the laminate after the cutting), regards this metal portion as the anode region 37, and connect an anode conductor thereto.

EXAMPLE 3

In the same way as Example 1, a strip-shaped aluminum foil (soft material) having a thickness of 100 $\mu$m and a width of 20 mm was used. A portion thereof corresponding to a distance of 15 mm in the axis direction was used as the cathode region 35, and subjected to surface roughening and chemical processing. On the region subjected to the surface roughening processing, an aluminum oxide film was formed as the oxide film. Conditions of the surface roughening and the chemical processing were the same as those of Example 1.

On the cathode region of the aluminum foil subjected to the surface roughening, a conductive polymer layer of poly-pyrrole was formed as the cathode layer. A capacitance portion was thus formed on aluminum foil.

As for the method for forming the poly-pyrrole layer, an ethyleneglycol aqueous solution containing pyrrole monomer of 1 mol/l was prepared, and an oxidizing agent solution containing iron sulfate ($Fe_2(SO_4)_3$) of 1 mol/l as an oxidizing agent was prepared. Only the cathode region of the aluminum foil was immersed in a monomer solution for five minutes. Subsequently, the cathode region was immersed in an oxidizing solution for five minutes. A poly-pyrrole layer was formed on an aluminum oxide film by using a chemical polymerization method. By thus repeating immersion in the monomer solution and immersion in the oxidizing agent solution, the poly-pyrrole layer was provided with a required thickness. As shown in FIG. 11A, aluminum foil 30 which included a cathode region 35 having a conductive polymer layer of 15 mm width, and an anode region 37 having a metal surface of 5 mm width from the other longer side was made.

As shown in FIG. 11B, 50 strip-shaped sheets of aluminum foil 30 were piled up so that capacitance portions and anode regions 36 of sheets of aluminum foil might be opposed to each other. A laminate 13 was thus prepared. Furthermore, as shown in FIG. 11C, two channels made of acryloyl (having an opening portion of 5 mm and a plate thickness of 1 mm) were used as the fixing frame material 20. The top face and the bottom face of the laminate material 13 were sandwiched in between portions of the two channels, and fixed. The framed laminate material 13 was cut at intervals of 2 mm by using a dicing saw to obtain a plurality of slices each having a thickness of 2 mm. Sections of these slices were polished. Thus, capacitor elements 12 each having a longitudinal dimension of 7 mm, a lateral dimension of 22 mm, and a thickness of 2 mm were prepared.

Next, on side faces of the anode regions of sheets of aluminum metal foil exposed at the section of the capacitor element, aluminum foil having a thickness of 100 $\mu$m and a width of 2 mm used as an anode conductor was welded. Furthermore, the capacitor element was subjected to anodizing processing. By using the anode conductor as an anode, electrolytic anodizing was conducted under the same condition as that of the primary valve metal foil making step. Aluminum oxide was thus formed on the side faces of the cathode regions of sheets of the aluminum metal foil.

Subsequently, by using poly-pyrrole as a cathode conductor, polymerization was conducted by repeating alternate immersion of the capacitance portions of sheets of the aluminum foil into a monomer solution and an oxidizing agent solution in the same way as the above described primary valve metal foil making step. Polymer formation of the poly-pyrrole layer was conducted by using the above described chemical polymerization method so as not to come in contact with the anode regions of sheets of the aluminum foil and so as to be insulated from sheets of the aluminum foil by aluminum oxide. A cathode conductor was thus made.

Lead wires were attached to each of capacitor elements. In this case, a lead wire was connected to the poly-pyrrole layer serving as the cathode conductor of the capacitor element by using a conductive material containing a carbon layer and silver paste. On the other hand, a different lead wire was connected to the sheet of aluminum foil serving as the anode conductor by welding.

EXAMPLE 4

Furthermore, the capacitor element of Example 3 was subjected to re-anodizing. Thereafter, lead wires were attached in the same way to complete a capacitor. Re-anodizing was conducted under the same condition as the anodizing of the valve metal foil of Example 1.

EXAMPLE 5

In the same way as the above described Example 3, sheets of aluminum foil were laminated to form a laminate. A fixing frame was attached to the laminate. In the laminate having channels made of acryloyl as the fixing frame, a large number of through holes of 1 mm diameter passing through the channel made of acryloyl, and the anode regions of aluminum foil, were formed of predetermined intervals of 2 mm. In each of the through holes, an aluminum wire serving as the anode conductor was inserted closely. All anode regions of sheets of aluminum foil were electrically connected.

Figure 15E:
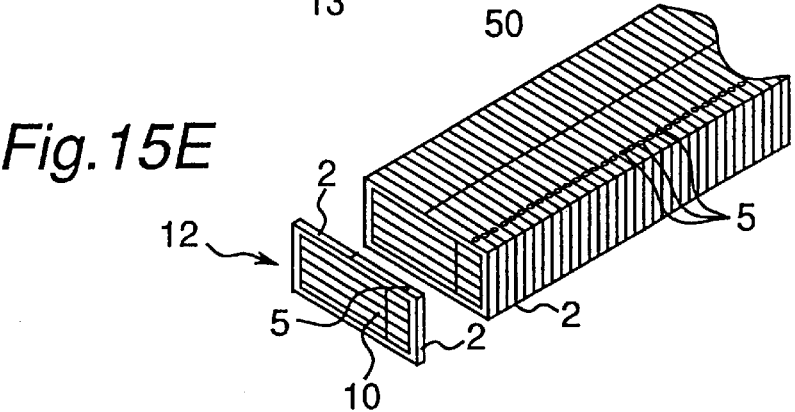

Subsequently, as shown in FIG. 15E, the laminate 13 was cut at intervals of 2 mm in a direction perpendicular to the longitudinal direction by using a dicing saw. A plurality of slices each having a thickness of 2 mm were thus obtained. Sections of these slices were polished by using sand paper. Thus, 40 capacitor elements 12 each having dimensions of 7 mm by 22 mm with thickness of 2 mm were prepared.

Furthermore, the capacitor elements were anodized, forming aluminum oxide on the metal surface of cathode regions of sheets of aluminum metal foil exposed at the section of each capacitor element 12. A cathode conductor 7 was applied with a poly-pyrrole layer on the side face 4 in the capacitor element 12, in order that it is in electrical connection with the cathode layers made of poly-pyrrole for each of sheets of aluminum foil. The poly-pyrrole layer for the cathode conductor 7 was applied by using the same method as the chemical polymerization method used in the above described step of preparing the primary valve metal foil. In the same way as Example 3, lead wires were attached to the cathode and anode conductors for the capacitor element 12 to form an electrolytic capacitor.

EXAMPLE 6

Furthermore, the above described capacitor element 12 was subjected to re-anodizing processing (oxide film repairing step) before attaching lead wires in the same way as the above described Example 4. Lead wires were attached to the capacitor element 12 in the same way. Thus 20 electrolytic capacitors were completed.

Tests were conducted on 20 electrolytic capacitors fabricated according to Example 3 and 20 electrolytic capacitors fabricated according to Example 4. Results are shown in Table 1.

Capacitance, impedance and leakage current of these electrolytic capacitors were measured.

As for the capacitance, capacitance at a measurement frequency of 100 Hz was measured with a bias voltage of 1.5 V.

As for the impedance, impedance at a measurement frequency of 100 Hz was measured with a bias voltage of 1.5 V.

As for the leakage current, a voltage of 6.3 V was applied to the electrolytic capacitor and a leakage current was measured 30 seconds later.

TABLE 1

| | Capacitance ($\mu F$) | Impedance (m$\Omega$) | Leakage current ($\mu A$) |
| --- | --- | --- | --- |
| Example 3 | 1076 | 15.7 | 7.8 |
| Example 4 | 1081 | 16.1 | 3.2 |
| Example 5 | 1085 | 14.8 | 8.2 |
| Example 6 | 1098 | 15.1 | 3.8 |

It will be appreciated from Table 1 that large capacitance and low impedance are achieved in all of the electrolytic capacitors of Examples. The reason is that any of the electrolytic capacitors has such a structure that sheets of aluminum foil each having a capacitance portion are laminated, and a cathode conductor is connected to the side face of the laminate of sheets of aluminum foil to lower the impedance of the electrolytic capacitor.

Especially, it will be appreciated that Examples 2 and 4 exhibit further lower leakage current values. In the electrolytic capacitor of Example 2, physical defects and chemical defects of the aluminum oxide film caused during the cathode conductor making step were repaired in the re-anodizing step.

Embodiment 6

Figure 20A:
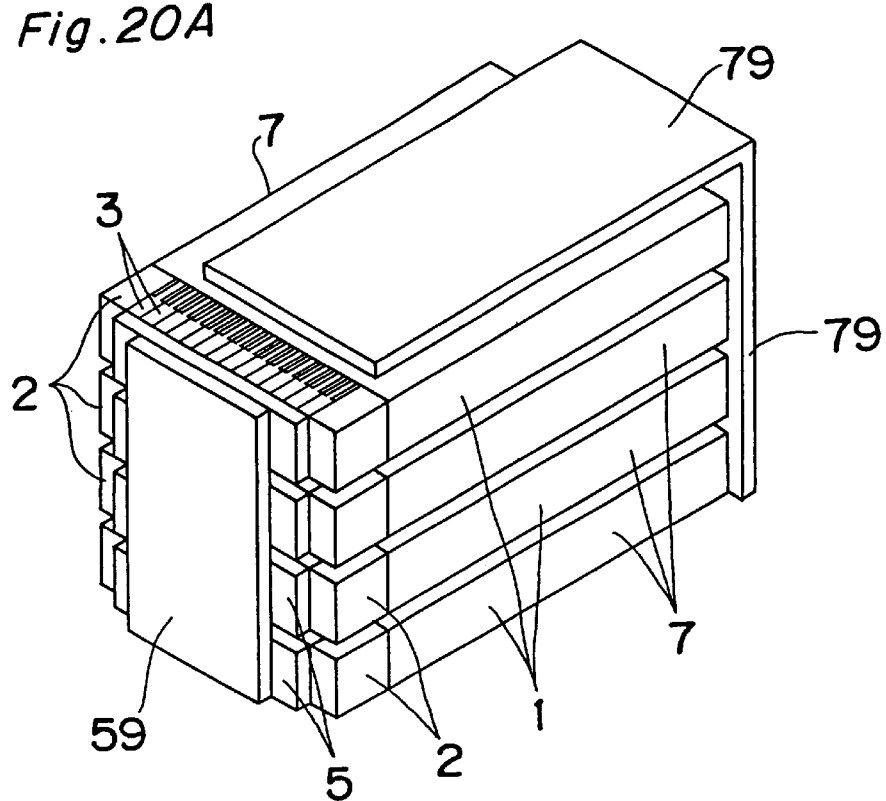
FIG. 20A is an perspective view of an piled electrolytic capacitor formed by integrating individual electrolytic capacitors of the present invention; and, FIG. 20B is a sectional view of the electrolytic capacitor of integration type shown in FIG. 20A.
Figure 20B:
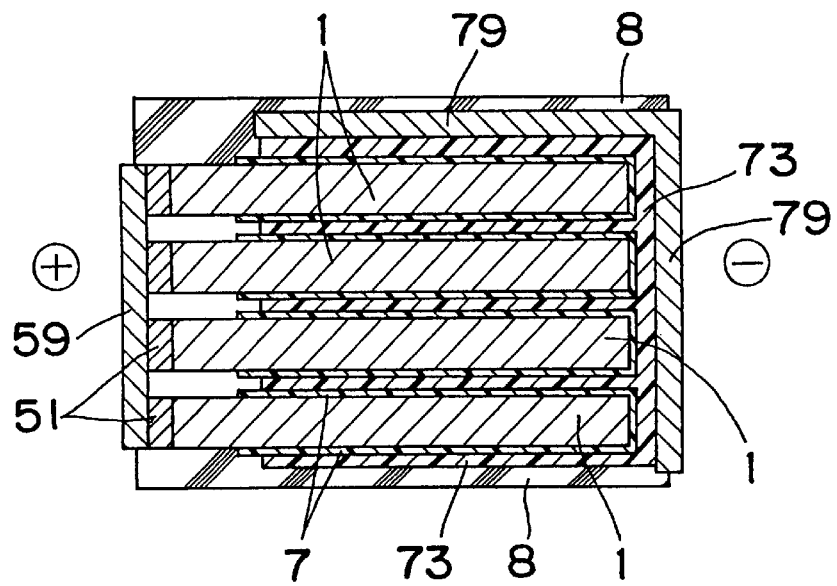

A piled electrolytic capacitor of the present invention is to pile the electrolytic capacitors above mentioned to be integrated with a common anode lead and a common cathode lead. The piled capacitor as shown in FIGS. 20A and 20B is composed of four simple electrolytic capacitors 1, as shown in FIGS. 18 and 19, which are piled so as to face side to side for the capacitors to make the conductive polymers in contact to each other. A L-like metal sheet is attached to the outer surfaces of the cathode conductive polymers 7 to make a common cathode lead 79, and a metal plate is used as a common anode lead 59 to be welded to every anode conductor foil 52 formed on the end faces of the electrolytic capacitors 1.

The integrally piled capacitor is coated with an insulating material 8 on the outside, except the anode lead 59 and cathode lead 79 exposed as end surfaces, thus providing a capacitor product. The piled electrolytic capacitor can effectively reduce the inner impedance, compared with a single large-width capacitor, to obtain the same capacitance, since the piled electrolytic capacitor is formed by several narrower electrolytic capacitors.

What is claimed is:

1. A method of producing an anode body for an electrolytic capacitor, said method comprising:

anodizing a part of a surface of a plurality of sheets of a valve metal foil after coarsening;

laminating, in a laminating direction, the plurality of the sheets of valve metal foil into a laminate material exposing a metal portion of each sheet;

framing the laminate material by a fixing frame material to cramp the laminate material in the laminating direction and to be in electrical connection to every exposed metal portion of the sheets of the valve metal foil;

cutting the framed laminate material to form anode bodies of a desired shape; and anodizing the anode bodies.

2. The method according to claim 1, wherein the cutting step comprises slicing the framed laminate material perpendicularly to a longitudinal direction to separate the anode bodies.

3. The method according to claim 1, further comprising forming an anode conductor on the laminate material in electrical contact to metal portions of the sheets of the valve metal foils after said framing and before said cutting.

4. The method according to claim 3, wherein said forming the anode conductor comprises:

piercing through holes which penetrate both the laminate and the frame material together and are aligned with constant intervals in a longitudinal direction of the framed laminate material; and inserting metal wires as anode conductors into the through holes to be buried.

5. The method according to claim 4, wherein said cutting comprises slicing the framed laminate material along planes perpendicular to a laminating surface of said foil at the positions between adjacent metal wires in the holes, to separate anode bodies each having at least one metal wire.

6. A method of producing an electrolytic capacitor comprising a laminate of a plurality of sheets of anode valve metal foil each of which has oxide dielectric layers of the metal film anodized on roughened surfaces of each anode valve metal foil and a cathode conductive polymer layer formed on the dielectric layer, a fixing frame to clamp the laminate in a laminating direction to fix the laminate, an anode conductor which is connected to a metal portion of the sheets of the anode valve metal foil, and a cathode conductor which is connected to the cathode conductive polymer layer, said method comprising:

applying sheets of valve metal foil with a conductive polymer layer as a cathode layer on a dielectric layer formed thereon;

laminating a plurality of sheets of the valve metal foil into a laminate material;

framing the laminate material by a fixing frame material;

cutting the framed laminate material at fixed intervals in a longitudinal direction to form capacitor elements having a laminate of valve metal foil and a fixing frame to fix the sheets of the valve metal foil;

anodizing the capacitor elements to form dielectric layers on as-cut metal faces of the laminate;

forming, on the as-cut side face of the laminate, a cathode conductor in contact with the conductive polymer layers as cathode layers, with insulating from the metal surface of the sheets of the valve metal foil via the dielectric layers.

7. The method of producing the electrolytic capacitor according to claim 6, further comprising coarsening the surface of the valve metal foil, and thereafter forming the dielectric layer thereon, prior to said applying the conductive polymer layers.

8. The method of producing the electrolytic capacitor according to claim 7, further comprising forming an anode conductor on an exposed side face of the framed laminate material from the fixing frame material, to come into contact with the metal portion of the valve metal foil prior to said cutting.

9. The method of producing the electrolytic capacitor according to claim 7, wherein said anodizing is performed after said forming the anode conductor.

10. The method of producing the electrolytic capacitor according to claim 8, wherein said forming the anode conductor comprises piercing through holes which penetrate both the laminate and the frame material together and are aligned with constant intervals in the longitudinal direction of the framed laminate material, and inserting the metal wires into the through holes to be buried to separate the electrolytic capacitors with the metal wire as an anode conductor inserted therein.

11. The method of producing the electrolytic capacitor according to claim 8, wherein said anodizing is performed after said forming the anode conductor.

12. The method of producing the electrolytic capacitor according to claim 10, wherein said anodizing is performed after said forming the anode conductor.

13. The method of producing the electrolytic capacitor according to claim 6, wherein the method further comprises forming an anode conductor to the electrolytic capacitor after said cutting.

14. The method of producing the electrolytic capacitor according to claim 13, wherein said forming the anode conductor comprises welding the sheets of the valve metal foil on an exposed side face of the laminate into a weld bead to be used as an anode conductor.

15. The method of producing the electrolytic capacitor according to claim 13, wherein said anodizing is performed after said forming the anode conductor.

16. The method of producing the electrolytic capacitor according to claim 6, wherein said forming the anode conductor comprises welding the sheets of the valve metal foil on an exposed side face of the laminate into a weld bead to be used as an anode conductor.

17. The method of producing the electrolytic capacitor according to claim 6, wherein said anodizing is performed after said forming the anode conductor.

* * * * *